(12) United States Patent
Zacharias et al.

(10) Patent No.: US 11,184,785 B2
(45) Date of Patent: Nov. 23, 2021

(54) RADIO MEASUREMENT AND CONFIGURATION

(71) Applicant: QUALCOMM Incorporated, San Diego, CA (US)

(72) Inventors: Leena Zacharias, San Jose, CA (US); Srinivasan Balasubramanian, San Diego, CA (US); Masato Kitazoe, Hachiouji (JP); Gavin Bernard Horn, La Jolla, CA (US); Aziz Gholmieh, Del Mar, CA (US); Kuo-Chun Lee, San Diego, CA (US); Suli Zhao, San Diego, CA (US); Reza Shahidi, San Diego, CA (US); Arvind Vardarajan Santhanam, San Diego, CA (US); Yongsheng Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 15/847,649

(22) Filed: Dec. 19, 2017

(65) Prior Publication Data
US 2018/0270682 A1 Sep. 20, 2018

Related U.S. Application Data

(60) Provisional application No. 62/472,776, filed on Mar. 17, 2017.

(51) Int. Cl.
*H04W 24/08* (2009.01)
*H04W 24/10* (2009.01)
(Continued)

(52) U.S. Cl.
CPC ........... *H04W 24/08* (2013.01); *H04W 24/10* (2013.01); *H04W 48/16* (2013.01);
(Continued)

(58) Field of Classification Search
None
See application file for complete search history.

(56) References Cited

U.S. PATENT DOCUMENTS

2011/0077010 A1* 3/2011 Xu ................... H04W 36/0033
455/437
2011/0103249 A1 5/2011 Kim et al.
(Continued)

OTHER PUBLICATIONS

"3rd Generation Partnership Project; Technical Specification Group Radio Access Network; Evolved Universal Terrestrial Radio Access (EUTRA) and Evolved Universal Terrestrial Radio Access Network (EUTRAN); Overall description; Stage 2 (Release 14)", 3GPP Standard; 3GPP TS 36.300, 3rd Generation Partnership Project (3GPP), Mobile Competence Centre; 650, Route Des Lucioles; F-06921 Sophia-Antipolis Cedex; France, vol. RAN WG2, No. V14.1.0, Dec. 30, 2016 (Dec. 30, 2016), pp. 1-317, XP051230306 [retrieved on Dec. 30, 2016].
(Continued)

*Primary Examiner* — Noel R Beharry
*Assistant Examiner* — Rodrick Mak
(74) *Attorney, Agent, or Firm* — Holland & Hart LLP/Qualcomm

(57) ABSTRACT

Methods, systems, and apparatuses for wireless communication are described. A user equipment (UE) may receive information from a network node. The system information may include inter-frequency configuration and measurement reporting configuration. The UE may perform a measurement of a frequency or multiple frequencies that are associated with the inter-frequency configuration. Subsequent to the measurement, the UE may transmit a report of the measurement of the frequency or multiple frequencies to the network node during a radio resource control (RRC) connection procedure based on the measurement reporting configuration.

25 Claims, 23 Drawing Sheets

(51) Int. Cl.
H04W 48/16 (2009.01)
H04W 74/08 (2009.01)
H04W 76/10 (2018.01)
H04W 76/25 (2018.01)
H04W 76/15 (2018.01)

(52) U.S. Cl.
CPC ....... *H04W 74/0833* (2013.01); *H04W 76/10* (2018.02); *H04W 76/25* (2018.02); *H04W 76/15* (2018.02)

(56) References Cited

U.S. PATENT DOCUMENTS

| | | | |
|---|---|---|---|
| 2013/0260745 | A1 | 10/2013 | Johansson et al. |
| 2013/0308481 | A1* | 11/2013 | Kazmi .................. H04W 24/02 370/252 |
| 2014/0192775 | A1 | 7/2014 | Li et al. |
| 2015/0156690 | A1* | 6/2015 | Futaki .................. H04W 36/08 455/436 |
| 2015/0215826 | A1* | 7/2015 | Yamada ............ H04W 36/0072 455/436 |
| 2016/0212753 | A1* | 7/2016 | Wu ...................... H04W 72/085 |
| 2016/0337925 | A1* | 11/2016 | Fujishiro ........... H04W 36/0055 |
| 2016/0338134 | A1* | 11/2016 | Nagasaka ............. H04W 36/08 |
| 2017/0111886 | A1* | 4/2017 | Kim .................... H04W 72/042 |
| 2017/0230878 | A1* | 8/2017 | Johansson ............ H04W 36/14 |
| 2018/0041925 | A1* | 2/2018 | Yilmaz ............ H04W 36/0022 |
| 2019/0053138 | A1* | 2/2019 | Wu ....................... H04W 48/16 |
| 2019/0089498 | A1* | 3/2019 | Pelletier .............. H04W 72/042 |
| 2019/0261258 | A1* | 8/2019 | Lindoff ................. H04W 88/06 |

OTHER PUBLICATIONS

"3rd Generation Partnership Project; Technical Specification Group Radio Access Network; Evolved Universal Terrestrial Radio Access (EUTRA); Radio Resource Control (RRC); Protocol specification (Release 14)", 3GPP Draft; Draft_36331-E20_V2, 3rd Generation Partnership Project (3GPP), Mobile Competence Centre; 650, Route Des Lucioles; F-06921 Sophia-Antipolis Cedex; France, Mar. 15, 2017 (Mar. 15, 2017), 720 Pages, XP051253394, Retrieved from the Internet: URL: http://www.3gpp.org/ftp/tsg_ran/WG2_RL2/Specifications/201703_draft_specs_after_RAN_75/[retrieved on Mar. 15, 2017].

Ericsson: "CA Measurements in Idle", 3GPP Draft; R2-1803607 CA Measurements in Idle, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 26, 2018-Mar. 2, 2018, Feb. 16, 2018 (Feb. 16, 2018), 9 Pages, XP051400633, Retrieved from the Internet: URL: http://www.3gpp.org/tsg_ran/WG2_RL2/TSGR2_101/Docs/R2-1803607 CA measurements in idle.docx [retrieved on Feb. 16, 2018] the whole document.

International Search Report and Written Opinion—PCT/US2018/019582—ISA/EPO—dated Sep. 4, 2018.

Partial International Search Report—PCT/US2018/019582—ISA/EPO—dated May 28, 2018.

Qualcomm Incorporated: "Fast SCell Configuration Through Quick SCell Measurement Reporting", 3GPP Draft; R2-1712256_FASTSCELLCONFIGURATION_THROUGH_QUICK_SCELL_MEASUREMENT_REPORTING-V3, 3rd Generation Partnership Project (3GPP), Mobile Competence Centre; 650, Route Des Lucioles; F-06921 Soph, vol. RAN WG2, No. Reno, USA; Nov. 27, 2017-Dec. 1, 2017, Nov. 16, 2017 (Nov. 16, 2017), 7 Pages, XP051370933, Retrieved from the Internet: URL: http://www.3gpp.org/tsg_ran/WG2_RL2/TSGR2_100/Docs/R2-1712256_FastScellConfiguration_through_quick_scell_measurement_reporting-v3.doc [retrieved on Nov. 16, 2017] the whole document.

Qualcomm Incorporated: "Fast SCell Configuration Through Quick SCell Measurement Reporting", 3GPP Draft; R2-1804546_FASTSCELLCONFIGURATION_THROUGH_QUICK_SCELL_MEASUREMENT_REPORTING-V1,3rd Generation Partnership Project (3GPP), Mobile Competence Centre; 650, Route Des Lucioles; F-06921 Soph, vol. RAN WG2, No. Sanya, Athens; Apr. 16, 2018-Apr. 20, 2018, Apr. 5, 2018 (Apr. 5, 2018), 7 Pages, XP051415145, Retrieved from the Internet: URL: http://www.3gpp.org/ftp/tsg_ran/WG2_RL2/TSGR2_101bis/Docs/R2-1804546_FastScellConfiguration_through_quick_scell_measurement_reporting_v1.doc [retrieved on Apr. 5, 2018] the whole document.

Taiwan Search Report—TW107106195—TIPO—dated Jul. 23, 2021.

* cited by examiner

RADIO MEASUREMENT AND CONFIGURATION

CROSS REFERENCES

The present application for patent claims priority to U.S. Provisional Patent Application No. 62/472,776 by Zacharias, et al., entitled "New Radio Measurement and Configuration," filed Mar. 17, 2017, assigned to the assignee hereof.

BACKGROUND

The following relates generally to wireless communication, and more specifically to New Radio measurement and configuration.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

UEs may perform a radio resource control (RRC) procedure, such as a RRC connection establishment procedure with a network node (e.g., LTE system or NR system). The RRC connection establishment procedure involves the UE accessing a cell and transmitting a RRC connection request to the network node. The network node may be associated with the LTE system or the NR system. Some examples of wireless communication systems provide faster switching between power states of the UE, improves performance at the coverage edge of a cell, and provides carrier aggregation and/or dual-connectivity configuration for the UE. For example, the UE may receive data transmitted by two network nodes, when the UE is configured with a dual-connectivity. One network node may be a master evolved NodeB (MeNB) and the other network node may be a secondary eNB (SeNB).

SUMMARY

The described techniques relate to improved methods, systems, devices, or apparatuses that support New Radio measurement and configuration. A UE may want to be configured for carrier aggregation or dual-connectivity to improve data throughput. For example, the UE may establish a connection with a network node due to receiving a large volume of data from an application running on the UE. Initially, the UE may perform a radio resource control (RRC) connection establishment with the network node. The network node may be part of a Long Term Evolution (LTE) system or a New Radio (NR) system. During the RRC connection establishment, the UE accesses a cell and transmits a RRC connection request message to the network node. For the UE to be configured for carrier aggregation or dual-connectivity, the UE is provided with a measurement configuration, in response to the RRC connection establishment. The measurement configuration identifies frequencies for the UE to measure, for the purpose of carrier aggregation or dual-connectivity. The UE performs the measurement on the identified frequencies and then reports the measurements to the network node. As a result, the network node configures the UE for carrier aggregation or dual-connectivity.

Carrier aggregation and/or dual-connectivity configuration based on UE measurement reporting, however, may only be performed after a delay. In the case where the UE is establishing the connection with a network node(s) due to extensive volume of instreaming data, the benefit of carrier aggregation or dual-connectivity (i.e., for providing additional data throughput) is delayed. In some cases, to reduce or eliminate the delay associated with configuring the UE with carrier aggregation or dual-connectivity after the RRC connection establishment, the UE may report measurements on other frequencies as part of a connection setup itself. Additionally or alternatively, the UE may directly access a secondary cell. As a result, the UE may be configured with carrier aggregation and/or dual-connectivity with minimal delay.

A method of for wireless communication is described. The method may include receiving system information from a first network node of a primary cell, the system information comprising inter-frequency configuration and measurement reporting configuration, performing a measurement of one or more frequencies associated with the inter-frequency configuration, and transmitting a report of the measurement of the one or more frequencies to the first network node during a RRC connection procedure based at least in part on the measurement reporting configuration.

An apparatus for wireless communication is described. The apparatus may include means for receiving system information from a first network node of a primary cell, the system information comprising inter-frequency configuration and measurement reporting configuration, means for performing a measurement of one or more frequencies associated with the inter-frequency configuration, and means for transmitting a report of the measurement of the one or more frequencies to the first network node during a RRC connection procedure based at least in part on the measurement reporting configuration.

Another apparatus for wireless communication is described. The apparatus may include a processor, memory in electronic communication with the processor, and instructions stored in the memory. The instructions may be operable to cause the processor to receive system information from a first network node of a primary cell, the system information comprising inter-frequency configuration and measurement reporting configuration, perform a measurement of one or more frequencies associated with the inter-frequency configuration, and transmit a report of the measurement of the one or more frequencies to the first network node during a RRC connection procedure based at least in part on the measurement reporting configuration.

A non-transitory computer readable medium for wireless communication is described. The non-transitory computer-readable medium may include instructions operable to cause a processor to receive system information from a first network node of a primary cell, the system information comprising inter-frequency configuration and measurement reporting configuration, perform a measurement of one or more frequencies associated with the inter-frequency configuration, and transmit a report of the measurement of the one or more frequencies to the first network node during a RRC connection procedure based at least in part on the measurement reporting configuration.

In some examples of the method, apparatus, and non-transitory computer-readable medium described above, the RRC connection procedure comprises an RRC establishment procedure or an RRC connection resume procedure. Some examples of the method, apparatus, and non-transitory computer-readable medium described above may further include processes, features, means, or instructions for receiving, from the first network node, a system information block (SIB) comprising the inter-frequency configuration or the measurement reporting configuration, or both.

Some examples of the method, apparatus, and non-transitory computer-readable medium described above may further include processes, features, means, or instructions for receiving the system information during an RRC idle mode or an RRC inactive mode, or both. Some examples of the method, apparatus, and non-transitory computer-readable medium described above may further include processes, features, means, or instructions for measuring the one or more frequencies associated with the inter-frequency configuration during the RRC idle mode or the RRC inactive mode, or both. In some examples of the method, apparatus, and non-transitory computer-readable medium described above, the one or more frequencies may be associated with one or more radio access technologies (RATs) comprising a LTE system or a NR system, or both.

Some examples of the method, apparatus, and non-transitory computer-readable medium described above may further include processes, features, means, or instructions for performing a RACH procedure directly with the second network node of the secondary cell, in response to a radio link failure with the second network node of the secondary cell.

Some examples of the method, apparatus, and non-transitory computer-readable medium described above may further include processes, features, means, or instructions for measuring one or more frequencies of a first RAT during the RRC idle mode or the RRC inactive mode, or both. Some examples of the method, apparatus, and non-transitory computer-readable medium described above may further include processes, features, means, or instructions for measuring one or more frequencies of a second RAT during the RRC idle mode or the RRC inactive mode, or both.

Some examples of the method, apparatus, and non-transitory computer-readable medium described above may further include processes, features, means, or instructions for receiving configuration of the first RAT or the second RAT, or both from the first network node. Some examples of the method, apparatus, and non-transitory computer-readable medium described above may further include processes, features, means, or instructions for receiving, in response to the RRC connection procedure, a secondary cell group (SCG) configuration from the first network node.

Some examples of the method, apparatus, and non-transitory computer-readable medium described above may further include processes, features, means, or instructions for receiving, from the first network node, instructions to allocate a secondary cell based at least in part on the SCG configuration. Some examples of the method, apparatus, and non-transitory computer-readable medium described above may further include processes, features, means, or instructions for transmitting, to the first network node, a message rejecting the allocation of the secondary cell.

Some examples of the method, apparatus, and non-transitory computer-readable medium described above may further include processes, features, means, or instructions for receiving secondary cell capability information from the first network node, the secondary cell capability information indicating one or more frequencies available for communication with a second network node of the secondary cell. Some examples of the method, apparatus, and non-transitory computer-readable medium described above may further include processes, features, means, or instructions for performing a random access channel (RACH) procedure with the second network node of the secondary cell, in response to the RRC connection procedure with the first network node of a primary cell.

In some examples of the method, apparatus, and non-transitory computer-readable medium described above, the primary cell comprises an LTE system or a NR system. In some examples of the method, apparatus, and non-transitory computer-readable medium described above, the secondary cell comprises an LTE system or an NR system.

In some examples of the method, apparatus, and non-transitory computer-readable medium described above, the RACH procedure message comprises a request to establish a connection with the second network node. Some examples of the method, apparatus, and non-transitory computer-readable medium described above may further include processes, features, means, or instructions for receiving a SCG configuration associated with the second network node based at least in part on the RACH procedure message.

Some examples of the method, apparatus, and non-transitory computer-readable medium described above may further include processes, features, means, or instructions for establishing a connection to the second network node based at least in part on the SCG configuration, wherein establishing the connection to the second network node comprises releasing a connection associated with the first network node.

Some examples of the method, apparatus, and non-transitory computer-readable medium described above may further include processes, features, means, or instructions for performing a RACH procedure or an initial attach procedure with the first network node based at least in part on a received RRC connection release message. Some examples of the method, apparatus, and non-transitory computer-readable medium described above may further include processes, features, means, or instructions for performing the RRC connection procedure with the first network node in response to the RACH procedure or the initial attach procedure.

Some examples of the method, apparatus, and non-transitory computer-readable medium described above may further include processes, features, means, or instructions for receiving an RRC connection reconfiguration message from the first network node. Some examples of the method, apparatus, and non-transitory computer-readable medium described above may further include processes, features, means, or instructions for identifying one or more master cell group (MCG) bearers or an SCG configuration setup message, or both, based at least in part on the RRC connection reconfiguration message, wherein the MCG may be associated with the primary cell. Some examples of the method, apparatus, and non-transitory computer-readable medium described above may further include processes, features, means, or instructions for transmitting an RRC connection reconfiguration complete message to the first network node. Some examples of the method, apparatus, and non-transitory computer-readable medium described above may further include processes, features, means, or instructions for performing a RACH procedure with a second network node of a secondary cell.

Some examples of the method, apparatus, and non-transitory computer-readable medium described above may further include processes, features, means, or instructions for determining that a communication link quality between the UE and the second network node may be below a threshold value. Some examples of the method, apparatus, and non-transitory computer-readable medium described above may further include processes, features, means, or instructions for transmitting a SCG failure information message to the first network node. Some examples of the method, apparatus, and non-transitory computer-readable medium described above may further include processes, features, means, or instructions for receiving, from the first network node, an RRC connection reconfiguration message comprising a SCG configuration release message. Some examples of the method, apparatus, and non-transitory computer-readable medium described above may further include processes, features, means, or instructions for transmitting an RRC connection reconfiguration complete message to the first network node.

Some examples of the method, apparatus, and non-transitory computer-readable medium described above may further include processes, features, means, or instructions for transmitting a RACH preamble to the first network node. Some examples of the method, apparatus, and non-transitory computer-readable medium described above may further include processes, features, means, or instructions for receiving a random access response message from the first network node based at least in part on the RACH preamble. Some examples of the method, apparatus, and non-transitory computer-readable medium described above may further include processes, features, means, or instructions for transmitting an RRC connection request message comprising a physical cell identity (PCI) associated with the second network node in a medium access control (MAC) control element (CE) to the first network node based at least in part on the received random access response message.

A method of for wireless communication is described. The method may include generating a system information message comprising inter-frequency configuration and measurement reporting configuration, transmitting the system information message to a UE, and receiving in response to the transmitting, from the UE, a report comprising a measurement of one or more frequencies associated with the inter-frequency configuration during a RRC establishment procedure.

An apparatus for wireless communication is described. The apparatus may include means for generating a system information message comprising inter-frequency configuration and measurement reporting configuration, means for transmitting the system information message to a UE, and means for receiving in response to the transmitting, from the UE, a report comprising a measurement of one or more frequencies associated with the inter-frequency configuration during a RRC establishment procedure.

Another apparatus for wireless communication is described. The apparatus may include a processor, memory in electronic communication with the processor, and instructions stored in the memory. The instructions may be operable to cause the processor to generate a system information message comprising inter-frequency configuration and measurement reporting configuration, transmit the system information message to a UE, and receive in response to the transmitting, from the UE, a report comprising a measurement of one or more frequencies associated with the inter-frequency configuration during a RRC establishment procedure.

A non-transitory computer readable medium for wireless communication is described. The non-transitory computer-readable medium may include instructions operable to cause a processor to generate a system information message comprising inter-frequency configuration and measurement reporting configuration, transmit the system information message to a UE, and receive in response to the transmitting, from the UE, a report comprising a measurement of one or more frequencies associated with the inter-frequency configuration during a RRC establishment procedure.

Some examples of the method, apparatus, and non-transitory computer-readable medium described above may further include processes, features, means, or instructions for transmitting, to the UE, a SIB message comprising the inter-frequency configuration or the measurement reporting configuration, or both. Some examples of the method, apparatus, and non-transitory computer-readable medium described above may further include processes, features, means, or instructions for configuring a second network node based at least in part on the received report.

Some examples of the method, apparatus, and non-transitory computer-readable medium described above may further include processes, features, means, or instructions for performing a second network addition procedure associated with the second network node based at least in part on transmitting an addition procedure message to the second network node. Some examples of the method, apparatus, and non-transitory computer-readable medium described above may further include processes, features, means, or instructions for transmitting a SCG configuration to the UE based at least in part on the performing. In some examples of the method, apparatus, and non-transitory computer-readable medium described above, the network node may be associated with a primary cell of a first RAT.

In some examples of the method, apparatus, and non-transitory computer-readable medium described above, the second network node may be associated with a secondary cell of a second RAT. In some examples of the method, apparatus, and non-transitory computer-readable medium described above, the first RAT and the second RAT may be different.

Some examples of the method, apparatus, and non-transitory computer-readable medium described above may further include processes, features, means, or instructions for receiving, from the UE, an RRC connection request message comprising link information of a second network node and a PCI in a MAC CE associated with the second network node during the RRC establishment procedure. Some examples of the method, apparatus, and non-transitory computer-readable medium described above may further include processes, features, means, or instructions for determining that a communication link quality between the UE and the second network node may be below a threshold value based at least in part on the received link information and PCI in the MAC CE. Some examples of the method, apparatus, and non-transitory computer-readable medium described above may further include processes, features, means, or instructions for transmitting, to the UE, an indication of one or more MCG bearers in an RRC connection reconfiguration message.

Some examples of the method, apparatus, and non-transitory computer-readable medium described above may further include processes, features, means, or instructions for determining that the communication link quality between the UE and the second network node may be above the threshold value based at least in part on the received link information and PCI in the MAC CE. Some examples of the method, apparatus, and non-transitory computer-readable medium described above may further include processes, features, means, or instructions for transmitting, to the UE, the indication of the one or more MCG bearers and an SCG configuration setup message in the RRC connection reconfiguration message based at least in part on the determining.

A method of for wireless communication is described. The method may include receiving, from a UE, a random access channel (RACH) procedure message comprising a SCG addition request to associate the network node as a secondary cell of the UE and performing an SCG addition procedure with a second network node based at least in part on the addition request, wherein the second network node is a primary cell of the UE.

An apparatus for wireless communication is described. The apparatus may include means for receiving, from a UE, a RACH procedure message comprising a SCG addition request to associate the network node as a secondary cell of the UE and means for performing an SCG addition procedure with a second network node based at least in part on the addition request, wherein the second network node is a primary cell of the UE.

Another apparatus for wireless communication is described. The apparatus may include a processor, memory in electronic communication with the processor, and instructions stored in the memory. The instructions may be operable to cause the processor to receive, from a UE, a RACH procedure message comprising a SCG addition request to associate the network node as a secondary cell of the UE and perform an SCG addition procedure with a second network node based at least in part on the addition request, wherein the second network node is a primary cell of the UE.

A non-transitory computer readable medium for wireless communication is described. The non-transitory computer-readable medium may include instructions operable to cause a processor to receive, from a UE, a RACH procedure message comprising a SCG addition request to associate the network node as a secondary cell of the UE and perform an SCG addition procedure with a second network node based at least in part on the addition request, wherein the second network node is a primary cell of the UE.

In some examples of the method, apparatus, and non-transitory computer-readable medium described above, the UE may be an RRC connected mode with a network node of a primary cell. In some examples of the method, apparatus, and non-transitory computer-readable medium described above, the network node may be associated with a secondary cell.

DETAILED DESCRIPTION

Figure 1:
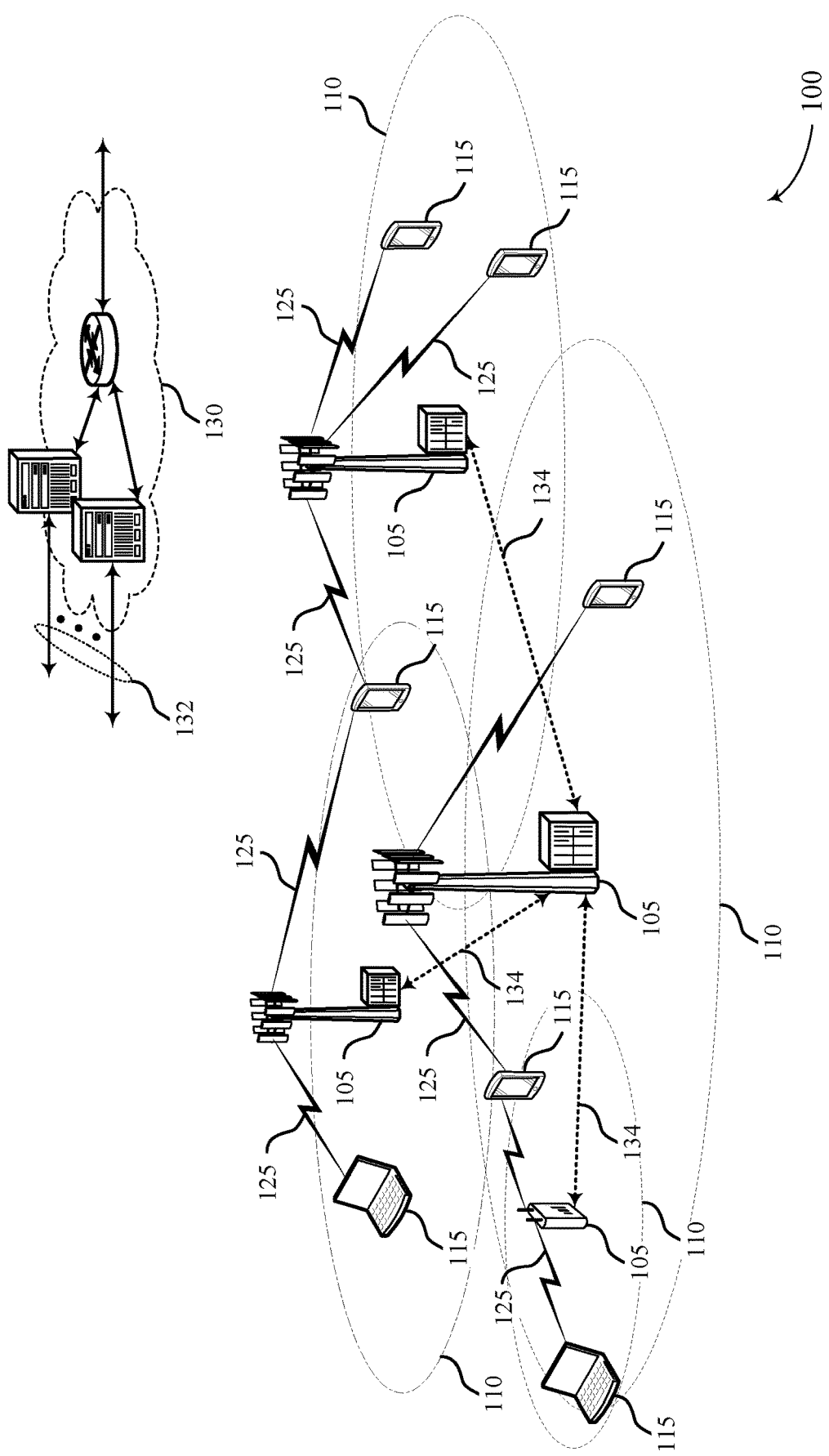
FIG. 1 illustrates an example of a system for wireless communication that supports New Radio measurement and configuration in accordance with aspects of the present disclosure.

A UE may be configured for carrier aggregation or dual-connectivity to improve data throughput. The UE may be in a RRC idle mode or a RRC inactive mode. The RRC idle mode or the RRC inactive mode may be an operational indication that the UE has no ongoing data transfer with a network. During the RRC idle mode or the RRC inactive mode, the UE may receive system information from a network node. However, the UE may not have configured resources for uplink or downlink communications, and may not have a configured context (e.g., security keys, registration identity, etc.) or timing advance for communication. The network node may be associated with a radio access technology (RAT) (e.g., LTE or NR). In some cases, the system information may include the relevant frequencies for the UE to measure for the same or different RATs. For example, the system information may indicate frequencies associated with an LTE system or an NR system. The UE may receive the system information as part of a system information block (SIB) message from the network node.

While in RRC idle mode or RRC inactive mode, the UE may perform a measurement of the identified frequencies in the received system information. In some examples, the UE may perform a cell search to acquire synchronization or reference signals from cells on the identified frequencies and perform the measurement of the identified cells. Subsequent to the measurement, the UE may perform a RRC connection procedure with the network node. For example, the RRC connection procedure may include a RRC connection establishment procedure. During the RRC connection establishment procedure the UE may transmit a measurement report related to the measured frequencies. In some examples, the measurement report may be transmitted as part of the RRC connection message. Based on the measurement report the network node may configure a second network node. The second network node may be associated with a different RAT and may serve one or more cells that may be configured as secondary cells for the UE. The measurement report may also include measurements of multiple RATs (e.g., LTE and NR frequencies), while the UE attempts to establish the connection with the network node. In this case, the network may configure either multiple RATs or only a single RAT. In some examples, the network may decide whether to configure a second network node based on the measurement report. In some cases, the network node may provide an option for the UE to approve or reject configuration of secondary cells served by the second network node. This may allow for reducing or eliminating the delay associated with configuring the UE with carrier aggregation or dual-connectivity. As a result, the UE may be configured with carrier aggregation and/or dual-connectivity with minimal delay.

An LTE-NR interworking network architecture with dual-connectivity, in some cases, may be used to avoid the issue that NR does not have ubiquitous coverage and has generally smaller cell radius. That is, a UE may have established a communication link with two network nodes (e.g., an LTE network node and an NR network node) using a dual-connectivity configuration. When a UE is in a coverage area of the NR network node, with both LTE and NR communication links configured, the UE may receive a RRC connection release message. As a result, the UE may need to reestablish a connection to the network. In some cases, reestablishing a connection with the NR network node may have a delay associated with it due to its dependency on first establishing the connection to the LTE network. For example, if the network node establishes only an LTE communication link and waits for the measurement report from the UE to indicate that the UE is in NR network node coverage prior to establishing a NR communication link this may result in an increased delay for data throughput. As a result, delay associated with the UE configuring the NR communication link may affect data throughput at the initial RRC connection setup of the NR communication link.

Aspects of the disclosure are initially described in the context of a wireless communications system. Exemplary wireless devices (e.g., UEs) network nodes (e.g., base station, eNB, gNB), systems, and process flow for New Radio measurement and configuration are then described. Aspects of the disclosure are further illustrated by and described with reference to apparatus diagrams, system diagrams, and flowcharts that relate to New Radio measurement and configuration.

FIG. 1 illustrates an example of a system 100 for wireless communication that supports New Radio measurement and configuration in accordance with various aspects of the present disclosure. The system 100 includes base stations 105, UEs 115, and a core network 130. In some examples, the system 100 may be a Long Term Evolution (LTE), LTE-Advanced (LTE-A) network, or a New Radio (NR) network. In some cases, the system 100 may support enhanced broadband communications, ultra-reliable (i.e., mission critical) communications, low latency communications, and communications with low-cost and low-complexity devices. In some examples, an LTE-NR interworking network architecture with dual-connectivity may be used to avoid the issue that NR may not have ubiquitous coverage and may generally have a smaller cell radius.

UE 115 may want to be configured for carrier aggregation or dual-connectivity to improve data throughput. UE 115 may receive system information from base station 105. Base station 105 may be associated with an LTE system or NR system. The system information may include inter-frequency configuration and measurement reporting configuration for UE 115. In some examples, base station 105 may transmit a SIB including the inter-frequency configuration or the measurement reporting configuration, or both to UE 115. UE 115 may receive the system information from base station 105 during a RRC idle mode or a RRC inactive mode. UE 115 may perform a measurement of one or more frequencies identified in the inter-frequency configuration. The measurement of the one or more frequencies by UE 115 may be performed during the RRC idle mode or the RRC inactive mode. After UE 115 performs the measurement, UE 115 may transmit a report of the measurements on the one or more frequencies to base station 105. In some examples, UE 115 may transmit the report during a RRC connection procedure based on the measurement configuration. The RRC connection procedure may include a RRC establishment procedure or a RRC connection resume procedure. This may allow for reducing or eliminating the delay associated with configuring UE 115 with carrier aggregation or dual-connectivity. As a result, UE 115 may be configured with carrier aggregation and/or dual-connectivity with minimal delay.

Some examples of the system 100 may include an LTE-NR interworking network architecture with dual-connectivity. The system 100 may be used to avoid the issue that NR system may not have ubiquitous coverage and may generally have a smaller cell radius, and UE 115 may have established a communication link with two network nodes (base stations 105) (e.g., an LTE network node and an NR network node) using dual-connectivity configuration. When UE 115 is in a coverage area of the NR network node, with both LTE and NR communication links configured, UE 115 may receive a RRC connection release message (e.g., for the LTE or NR links). UE 115 may need to reestablish a connection in response to the RRC connection release message. In some cases, reestablishing a connection with the NR network node may have a delay associated with it due to the dependency of the NR link on setting up the LTE link. For example, if the network node establishes only an LTE communication link and waits for the measurement report from UE 115 to indicate that UE 115 is in NR network node coverage prior to establishing a NR communication link, this may result in an increased delay for data throughput. In other words, there may be delay associated with UE 115 configuring the NR communication link which may affect data throughput at the initial RRC connection setup of the NR communication link.

Base stations 105 may wirelessly communicate with UEs 115 via one or more base station antennas. Each base station 105 may provide communication coverage for a respective geographic coverage area 110. Communication links 125 shown in the system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. In some configurations, various functions of each access network entity or base station 105 may be distributed across various network devices (e.g., radio heads and access network controllers) or consolidated into a single network device (e.g., a base station 105).

The system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, the system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, the system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of the system 100 may use beamforming. For example, base station 105 may have an antenna array with a number of rows and columns of antenna ports that base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, the system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of a RRC connection between a UE 115 and base station 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

The system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, the system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, the system 100 may utilize both licensed and unlicensed radio frequency spectrum bands. For example, the system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both. In some cases, a user equipment (UE) 115 may be served by cells from two or more base stations 105 that are connected by a non-ideal backhaul 134 in dual connectivity operation. For example, the connection between the serving base stations 105 may not be sufficient to facilitate precise timing coordination. Thus, in some cases, the cells serving a UE 115 may be divided into multiple TAGs. Each TAG may be associated with a different timing offset, such that UE 115 may synchronize uplink (UL) transmissions differently for different UL carriers.

Random Access Channel is a transport channel used for access to the network when UE 115 does not have accurate uplink timing synchronization, or when UE 115 does not have any allocated uplink transmission resource. The random access channel (RACH) is normally contention-based, which may result in collisions between UEs 115. After UE 115 decodes SIB 2, it may transmit a RACH preamble to base station 105. This may be known as RACH message 1. For example, the RACH preamble may be randomly selected from a set of 64 predetermined sequences. This may enable base station 105 to distinguish between multiple UEs 115 trying to access the system simultaneously. Base station 105 may respond with a random access response (RAR), or RACH message 2, that provides an UL resource grant, a timing advance and a temporary cell radio network temporary identity (C-RNTI). UE 115 may then transmit a RRC connection request, or RACH message 3, along with a temporary mobile subscriber identity (TMSI) (if UE 115 has previously been connected to the same wireless network) or a random identifier. The RRC connection request may also indicate the reason UE 115 is connecting to the network (e.g., emergency, signaling, data exchange, etc.). Base station 105 may respond to the connection request with a contention resolution message, or RACH message 4, addressed to UE 115, which may provide a new C-RNTI. If UE 115 receives a contention resolution message with the correct identification, it may proceed with RRC setup. If UE 115 does not receive a contention resolution message (e.g., if there is a conflict with another UE 115) it may repeat the RACH process by transmitting a new RACH preamble.

The RRC protocol handles the Layer 3 control plane signaling by which the E-UTRAN controls UE 115 behavior. The RRC protocol supports the transfer of both common and dedicated Non-Access Stratum information. It covers a number of functional areas including System Information broadcasting, connection control including handover within LTE, network-controlled inter-RAT mobility and measurement configuration and reporting. The Core Network (CN) in the LTE/System Architecture Evolution (SAE) system. The EPC is responsible for the overall control of UE 115 and establishment of the bearers. The main logical nodes of the EPC are the Packet Data Network Gateway (P-GW), Serving-Gateway (S-GW) and Mobility Management Entity (MME). A base station 105 may be connected by an S1 interface to the core network 130. In some cases, the core network may be an evolved packet core (EPC), which may include at least one MME, at least one S-GW, and at least one P-GW. In some cases, the core network may also include one or more of an authentication server function (AUSF), a security anchor function (SEAF), or a security management function (SCMF). The MME may be the control node that processes the signaling between UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched Streaming Service (PSS).

Figure 2:
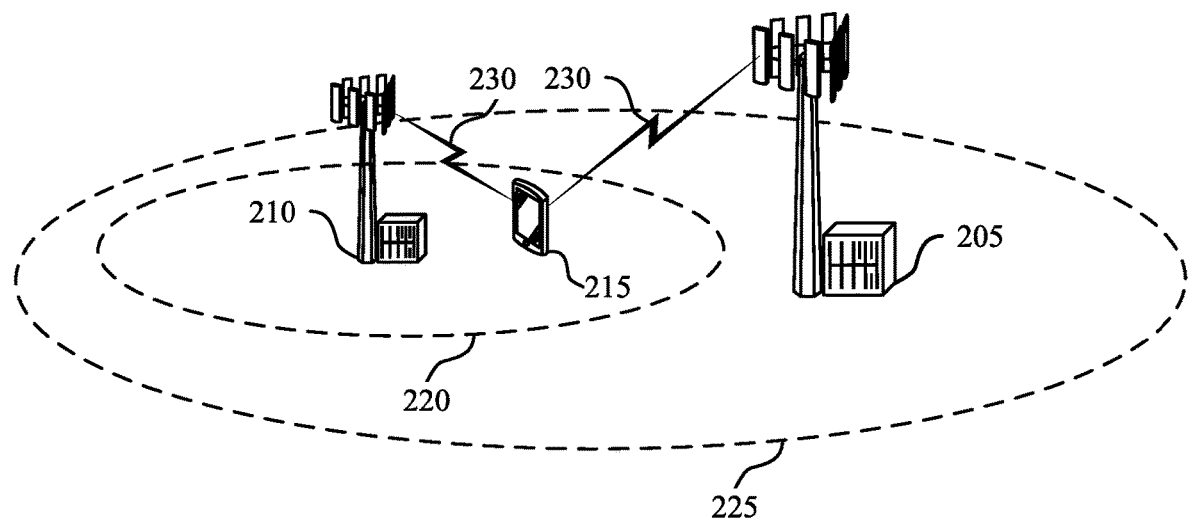
FIG. 2 illustrates an example of a system that supports New Radio measurement and configuration in accordance with aspects of the present disclosure.

FIG. 2 illustrates an example of a system 200 that supports New Radio measurement and configuration in accordance with aspects of the present disclosure. System 200 may include UE 215, base station 205, and base station 210. UE 215 may be an example of one or more UEs as described herein with reference to FIG. 1. Base station 205 may be an eNB as described herein with reference to FIG. 1. Base station 210 may be a gNB as described herein with reference to FIG. 1. For example, base station 205 may be associated with a LTE system and base station 210 may be associated with a NR system. Base station 205 may be associated with a coverage area 225. Additionally, base station 210 may be associated with a coverage area 220. Both base station 205 and base station 210 may communicate with UE 215 via communication links 230. Aspects of the following communication examples are described as occurring between UE 215, base station 205, and base station 210.

UE 215 may be configured for carrier aggregation or dual-connectivity to improve data throughput. UE 215 may be in a RRC idle mode or a RRC inactive mode. The RRC idle mode or the RRC inactive mode may be an operational indication that UE 215 has no RRC connection established with a network (e.g., base station 205 or base station 210, or both). During the RRC idle mode or the RRC inactive mode, UE 215 may receive system information from base station 205. Base station 205 may be associated with a first RAT (e.g., LTE). In some cases, the system information may include the relevant frequencies for UE 215 to measure for the same or different RATs. For example, the system information may indicate frequencies associated with an LTE system and/or an NR system. UE 215 may receive the system information as part of a SIB message from base station 205.

While in RRC idle mode or RRC inactive mode, UE 215 may perform measurement of the identified frequencies in the received system information. UE 215 may perform a cell search to identify one or more cells at the identified frequencies and perform measurements on signals (e.g., synchronization signals, reference signals, etc.) associated with the cells. Subsequent to the measurement, UE 215 may perform a RRC connection procedure with base station 205. For example, the RRC connection procedure may be a RRC connection establishment procedure. During the RRC connection establishment procedure, UE 215 may transmit a measurement report related to the measured frequencies. In some examples, the measurement report may be transmitted as part of the RRC connection message. Based on the measurement report, base station 205 may configure one or more cells of base station 210 to serve UE 215. In some cases, base station 210 may be associated with a different RAT and the one or more cells may be configured as secondary cells for UE 215.

The measurement report may include measurements of multiple RATs (e.g., LTE and NR frequencies), while UE 215 attempts to establish the connection with base station 205. The network may configure either multiple RATs or only a single RAT. For example, base station 205 may decide whether to configure base station 210 based on the measurement report. In some cases, base station 205 may provide an option for UE 215 to approve or reject configuration of cells of base station 210. This may allow for reducing or eliminating the delay associated with configuring UE 215 for carrier aggregation or dual-connectivity. As a result, UE 215 may be configured with carrier aggregation and/or dual-connectivity with minimal delay.

Base station 205 may generate a system information message. The system information may include an inter-frequency configuration and a measurement reporting configuration. Base station 205 may transmit (e.g., broadcast) the system information message. UE 215 may receive the system information message from base station 205. UE 215 may perform a measurement of one or more frequencies associated with the inter-frequency configuration, and transmit a report of measurements for detected cells on the one or more frequencies to base station 205 during a RRC connection procedure based on the measurement reporting configuration. The RRC connection procedure may be, for example, a RRC establishment procedure or a RRC connection resume procedure.

In some cases, UE 215 may receive a SIB message that includes the inter-frequency configuration or the measurement reporting configuration, or both. UE 215 may receive the system information during a RRC idle mode or a RRC inactive mode. As a result, UE 215 may measure the cells detected on the one or more frequencies associated with the inter-frequency configuration during the RRC idle mode or the RRC inactive mode. UE 215 may perform a cell search on the one or more frequencies. In some examples, UE 215 may perform the measurement of the one or more frequencies during the RRC idle mode or the RRC inactive mode, based on a result (e.g., the detected cells) of the cell search. UE 215 may measure the one or more frequencies of a first RAT and a second RAT during the RRC idle mode or the RRC inactive mode.

Base station 205 may configure base station 210 using the received measurement report. In some examples, configuring base station 210 may include performing a second network addition procedure with base station 210 based on transmitting an addition procedure message to base station 210. Base station 205 may transmit a SCG configuration to UE 215 based on the network addition procedure. In some examples, UE 215 may configure one or more cells of base station 210 as secondary cells based on instructions received in the SCG configuration. Alternatively, UE 215 may transmit a message rejecting configuration of one or more cells of base station 210.

In some examples, UE 215 may receive secondary cell capability information from base station 205. The secondary cell capability information may indicate one or more frequencies available for communication with base station 210. UE 215 may perform a RACH procedure with base station 210 on at least one of the one or more frequencies. In some cases, UE 215 may receive a SCG configuration associated with base station 210 based on a RACH procedure message. UE 215 may establish a connection to base station 210 based on the SCG configuration. In some cases, establishing the connection to base station 210 may include releasing a connection associated with base station 205.

Some examples of system 200 may be associated with LTE-NR interworking network architecture with dual-connectivity that may be used to avoid the issue that NR may not have ubiquitous coverage and generally has a smaller cell radius (e.g., coverage area 220) than cells of an LTE network. In some cases, UE 215 may establish a communication link with base station 205 and base station 210 (e.g., an LTE network node and an NR network node) using a dual-connectivity configuration. When UE 215 is in a coverage area of base station 210, with both LTE and NR communication links configured, UE 215 may receive a RRC connection release message. As a result, UE 215 may need to reestablish a connection to base station 205 or base station 210. In some cases, reestablishing a connection with base station 210 may have a delay associated with it. For example, if UE 215 initially establishes only an LTE communication link (e.g., communication link 230) with base station 205, base station 205 waiting for the measurement report from UE 215 to indicate that UE 215 is in NR network node coverage (e.g., coverage area 220) prior to establishing a NR communication link may result in an increased delay for data throughput. As a result, there is a delay associated with UE 215 configuring the NR communication link which may affect data throughput of the NR communication link.

UE 215 may perform a RACH procedure or an initial attach procedure with base station 205 upon receiving a RRC connection release message. In some examples, UE 215 may receive a RRC connection reconfiguration message from base station 205, and identify one or more master cell group (MCG) bearers or an SCG configuration setup message, or both, based on the RRC connection reconfiguration message. UE 215 may transmit a RRC connection reconfiguration complete message to base station 205.

In some examples, UE 215 may perform a RACH procedure directly with a secondary cell of a second network node, in response to a radio link failure with the secondary cell of the second network node. As a result, UE 215 may connect directly to the secondary cell group without going through the primary cell.

In some cases, UE 215 may determine that a communication link quality between UE 215 and base station 210 is below a threshold value. UE 215 may transmit a SCG failure information message to base station 205. UE 215 may receive from base station 205 a RRC connection reconfiguration message that may include a SCG configuration release message. UE 215 may, as a result, transmit a RRC connection reconfiguration complete message to base station 205. Alternatively, in some cases, UE 215 may transmit a RACH preamble to base station 205. Base station 205 may transmit a random access response message to UE 215 based on the RACH preamble. In some cases, UE 215 may transmit a RRC connection request message that includes a physical cell identity (PCI) associated with base station 210 in a MAC CE to base station 205.

Figure 3:
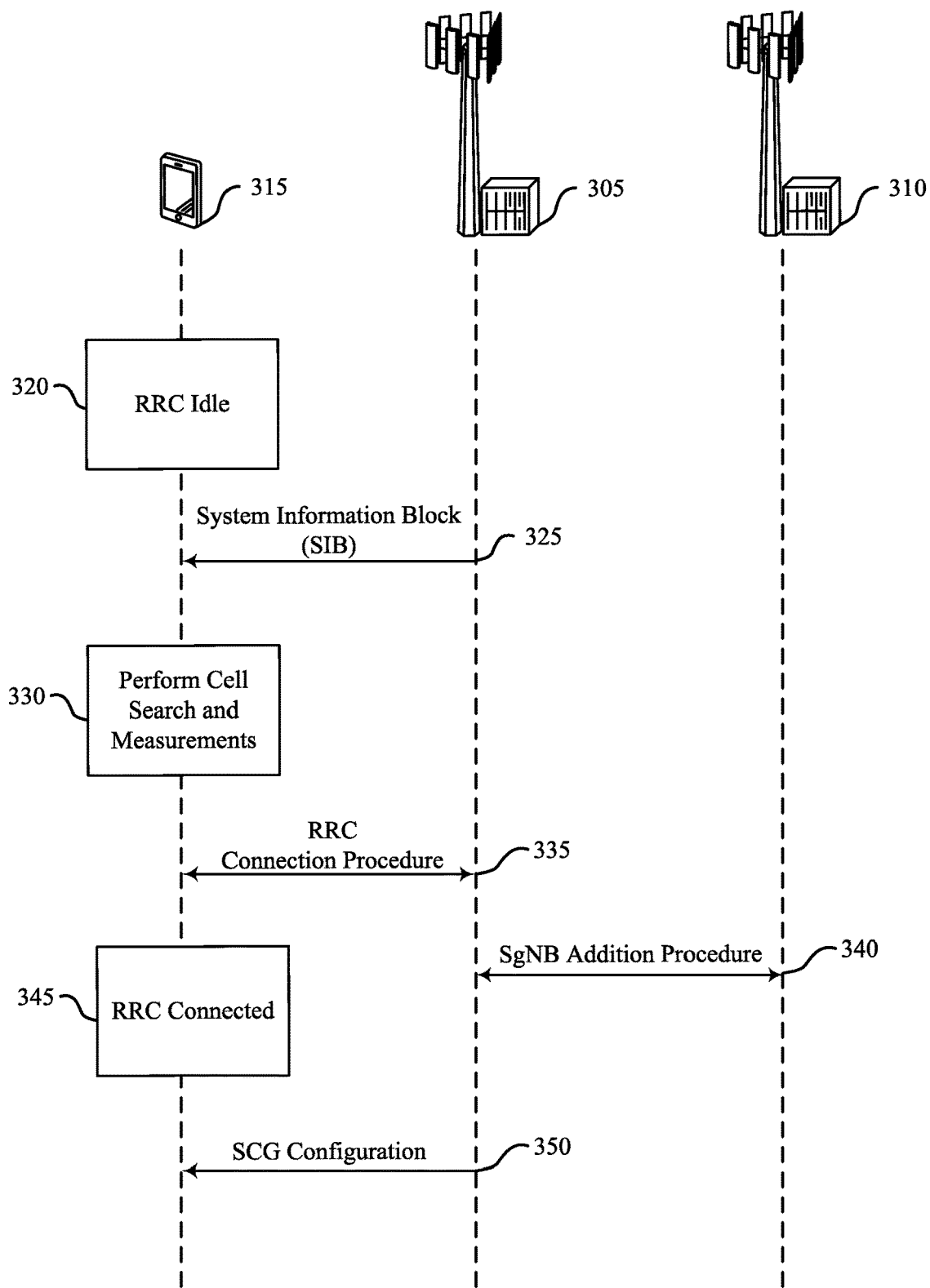
FIG. 3 illustrates an example of a process flow that supports New Radio measurement and configuration in accordance with aspects of the present disclosure.

FIG. 3 illustrates an example of a process flow 300 that supports New Radio measurement and configuration in accordance with aspects of the present disclosure. Process flow 300 may include UE 315, base station 305, and base station 310. UE 315 may be an example of one or more UEs as described herein with reference to FIGS. 1 and 2. Base station 305 may be an eNB as described herein with reference to FIGS. 1 and 2. Base station 310 may be a gNB as described herein with reference to FIGS. 1 and 2. For example, base station 305 may be associated with a LTE system and base station 310 may be associated with a NR system. Aspects of the following communication examples are described as occurring between UE 315, base station 305, and base station 310.

At 320, UE 315 may be in a RRC idle mode or a RRC inactive mode. In some examples, the RRC idle mode or the RRC inactive mode, or both may be associated with UE 315 passively maintaining the ability to connect with a network (e.g., camping on a cell). In RRC idle mode or RRC inactive mode, UE 315 may perform cell selection and reselection, location registration, reception of paging, reception of system information, etc., to enable UE 315 to establish a RRC connection for signaling or data transmission and reception from the network when data for communication is present.

Base station 305 may generate a system information message. At 325, base station 305 may transmit the system information message to UE 315. The system information message may include an inter-frequency configuration, a measurement reporting configuration, secondary cell capability information indicating one or more frequencies available for communication with base station 310, or a combination thereof. Base station 305 may transmit the system information message in a SIB message to UE 315.

UE 315 may receive the system information from base station 305. The system information may indicate one or more frequencies associated with the inter-frequency configuration for measuring. In response to receiving the system information, UE 315 may at 330 perform a cell search on the one or more frequencies during the RRC idle mode or the RRC inactive mode. UE 315 may detect cells on the one or more frequencies and may perform a measurement of signals transmitted by the detected cells. In some examples, UE 315 may measure one or more frequencies of a first RAT during the RRC idle mode or the RRC inactive mode. In some examples, UE 315 may also measure one or more frequencies of a second RAT during the RRC idle mode or the RRC inactive mode.

At 335, UE 315 and base station 305 may perform a RRC connection procedure. In some cases, to reduce or eliminate the delay associated with configuring UE 315 with carrier aggregation or dual-connectivity after the RRC connection establishment, UE 315 may report measurements on other frequencies as part of a connection setup at 335. In some examples, UE 315 may transmit a report of the measurement of the one or more frequencies to base station 305 during the RRC connection procedure based on the measurement reporting configuration received in the system information. For example, UE 315 may perform the measurement on the identified frequencies and, if it detects a suitable NR cell served by base station 310, report the measurements to base station 305. The RRC connection procedure may be, for example, a RRC establishment procedure or a RRC connection resume procedure. The RRC connection procedure may include an RRC connection request message sent from the UE 315 to the base station 305, an RRC connection setup message sent from the base station 305 to the UE 315, and an RRC connection setup complete message sent from the UE 315 to the base station 305. The RRC connection request message may be a first layer-3 message performed subsequent to a RACH procedure. The measurement report may be sent in the RRC connection request message or the RRC connection setup complete message.

Using the measurements received at 335, base station 305 configures UE 315 for carrier aggregation or dual-connectivity at 340. For example, base station 305 and base station 310 may perform a second network addition procedure (e.g., a secondary gNB (SgNB) addition procedure) based on base station 305 transmitting an addition procedure message to base station 310. At 345, UE 315 may be in a RRC connected mode with base station 305 based on the RRC connection procedure. In some examples, UE 315 is in the RRC connected mode prior to base station 305 and base station 310 performing the addition procedure. At 350, base station 305 may transmit SCG configuration to UE 315. The SCG configuration may include instructions to configure one or more cells served by base station 310 as secondary cells for UE 315.

Figure 4:
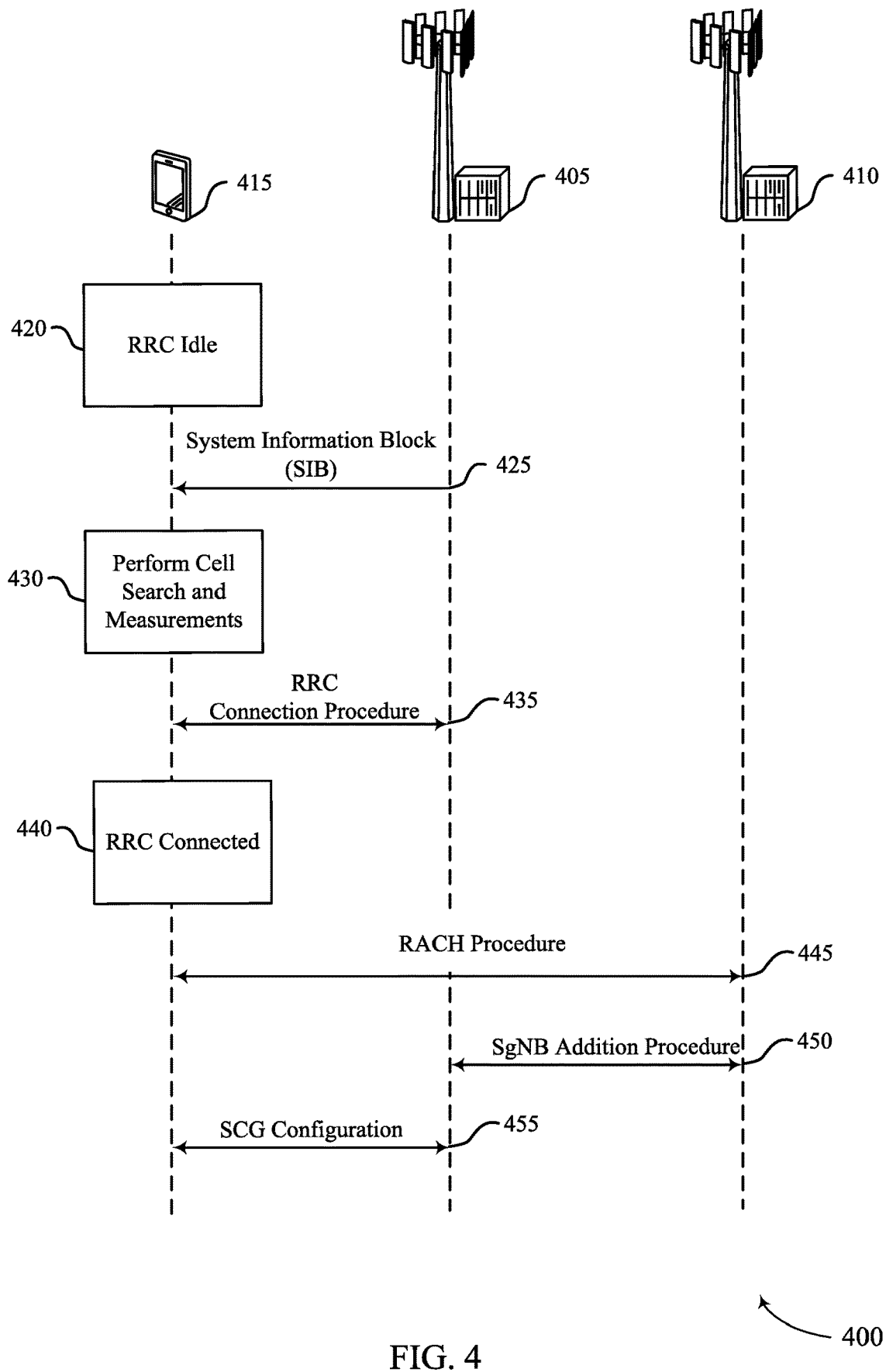
FIG. 4 illustrates an example of a process flow that supports New Radio measurement and configuration in accordance with aspects of the present disclosure.

FIG. 4 illustrates an example of a process flow 400 that supports New Radio measurement and configuration in accordance with aspects of the present disclosure. Process flow 400 may include UE 415, base station 405, and base station 410. UE 415 may be examples of one or more UEs as described herein with reference to FIGS. 1-3. Base station 405 may be a eNB as described herein with reference to FIGS. 1-3. Base station 410 may be a gNB as described herein with reference to FIGS. 1-3. For example, base station 405 may be associated with a LTE system and base station 410 may be associated with a NR system. Aspects of the following communication examples are described as occurring between UE 415, base station 405, and base station 410.

UE 415 may in some cases directly access a secondary cell based on information indicating which frequencies or cells can be added as secondary cells. Once UE 415 connects to a primary cell associated with a primary RAT, UE 415 may perform a RACH procedure with a cell of a second RAT. The RACH procedure may include a request for addition of the cell of the second RAT as a secondary cell for UE 415. In some examples, UE 415 may perform acquisition of the secondary cell in parallel during acquisition of the primary RAT. In some cases, if secondary cell acquisition succeeds and the primary cell acquisition fails, UE 415 may have an option to assign the secondary cell as the primary cell.

At 420, UE 415 may be in a RRC idle mode or a RRC inactive mode. In some examples, the RRC idle mode or the RRC inactive mode may be associated with UE 415 passively maintaining the ability to connect with a network (e.g., camping on a cell). In RRC idle mode or RRC inactive mode, UE 415 may perform cell selection and reselection, location registration, reception of paging, reception of system information, etc., to enable UE 415 to establish a RRC connection for signaling or data transmission and reception from the network when data for communication is present.

Base station 405 may generate a system information message. At 425, base station 405 may transmit the system information message to UE 415. For example, base station 405 may transmit the system information message in a SIB message. In some cases, the system information message may include an inter-frequency configuration or a measurement reporting configuration, or secondary cell capability information indicating one or more frequencies available for communication with base station 410, or a combination thereof.

UE 415 may receive the system information from base station 405. The system information may indicate one or more frequencies associated with the inter-frequency configuration for measuring. In response to receiving the system information, UE 415 may at 430 perform a cell search on the one or more frequencies during the RRC idle mode or the RRC inactive mode. UE 415 may perform a measurement of the one or more frequencies subsequent to the cell search. In some examples, UE 415 may measure one or more frequencies of a first RAT and a second RAT during the RRC idle mode or the RRC inactive mode.

At 435, UE 415 and base station 405 may perform a RRC connection procedure. As part of the RRC connection procedure, UE 415 may in some examples transmit a report of the measurement of the one or more frequencies to base station 405 during the RRC connection procedure based on the measurement reporting configuration received in the system information. The RRC connection procedure may be, for example, a RRC establishment procedure or a RRC connection resume procedure. The RRC connection procedure may include an RRC connection request message sent from the UE 415 to the base station 405, an RRC connection setup message sent from the base station 405 to the UE 415, and an RRC connection setup complete message sent from the UE 415 to the base station 405. The RRC connection request message may be a first layer-3 message performed subsequent to a RACH procedure. The measurement report may be sent in the RRC connection request message or the RRC connection setup complete message. In some examples, UE 415 may receive configuration of the first RAT or the second RAT, or both from base station 405. At 440, UE 415 may transition to a RRC connected mode with base station 405 based on the RRC connection procedure.

At 445, UE 415 may perform a RACH procedure with base station 410. In some examples, base station 410 may be part of a secondary cell. Alternatively, base station 405 may part of a primary cell. The RACH procedure in some examples may include UE 415 transmitting a request to establish a connection with base station 410. The RACH procedure may include a SCG addition request to associate base station 410 as a secondary cell of UE 415.

At 450, base station 410 may transmit a second network addition procedure with base station 405 based on the addition request. The second network addition procedure may be a SgNB addition procedure. At 455, base station 405 may transmit SCG configuration to UE 415. The SCG configuration may include instructions to allocate resources associated with base station 410. In some examples, UE 415 may perform a RACH procedure directly with a second network node of a secondary cell, in response to a radio link failure with the second network node of the secondary cell. UE 415 may connect directly to the secondary cell group without going through the primary cell.

Figures 5A, 5B, 5C:
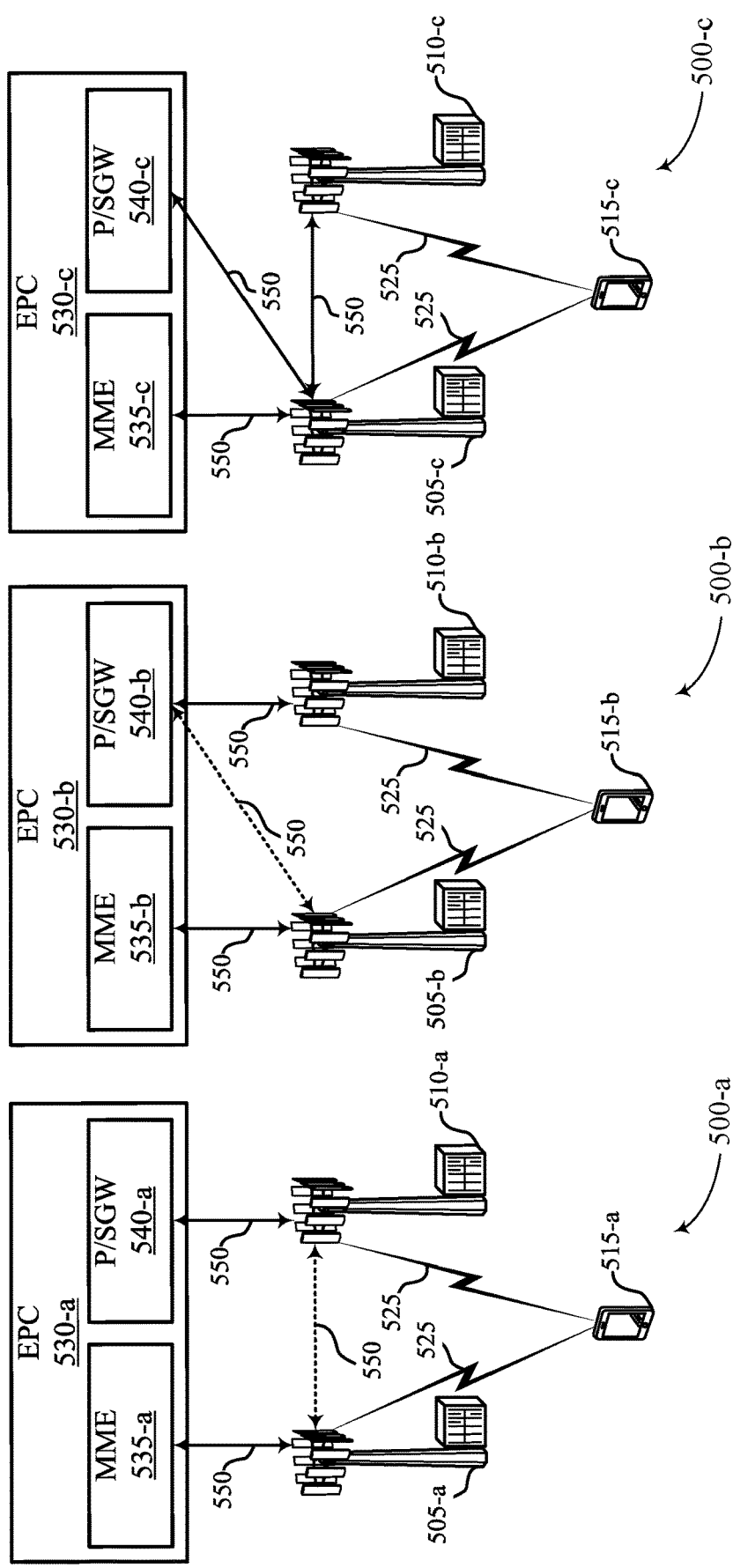
FIGS. 5A through 5C illustrate an example of a system that supports New Radio measurement and configuration in accordance with aspects of the present disclosure.

FIGS. 5A through 5C illustrate an example of systems 500 that support New Radio measurement and configuration in accordance with aspects of the present disclosure. Systems 500 may include UEs 515 (UE 515-*a*, UE 515-*b*, and UE 515-*c*), base station 505 (base station 505-*a*, base station 505-*b*, and base station 5050-*c*), base station 510 (base station 510-*a*, base station 510-*b*, base station 510-*c*), EPCs 530 (EPC 530-*a*, EPC 530-*b*, and EPC 530-*c*), MMES 535 (MME 535-*a*, MME 535-*b*, and MME 535-*c*), and P/SGWs 540 (P/SGWs 540-*a*, P/SGWs 540-*b*, and P/SGWs 540-*c*). UEs 515 may be examples of one or more UEs as described herein with reference to FIGS. 1-4. Base stations 505 and base stations 510 may be examples of one or more base stations as described herein with reference to FIGS. 1-4. EPCs 530, MMES 535, and P/SGWs 540 may examples of an EPC, MME, and P/SGW as described herein with reference to FIGS. 1-4. Aspects of the following communication examples are described as occurring between UE 515, base station 505, base station 510, and EPC 530 (i.e., MME 535 and P/SGW 540). System 500 may support providing MCG at base station 505 and DC split bearer or SCG bearer at base station 610.

FIG. 5A illustrates an example of system 500-*a* that supports New Radio measurement and configuration in accordance with aspects of the present disclosure. EPC 530-*a* may be examples of core network 130 as described herein with reference to FIG. 1. EPC 530-*a* may include MME 535-*a* and P/SGW 540-*a*. MME 535-*a* may be a control node that processes signaling between UE 515-*a* and the EPC 530-*a*. P/SGW 540-*a* may include a packet data network gateway (P-GW) and a serving gateway (S-GW). In some examples, the P-GW and the S-GW may be separate and located at different locations. User IP packets may be transferred through the P/SGW 540-*a*.

Base station 505-*a*, in some examples, may be a eNB associated with a LTE system. The MME 535-*a* may communicate information to base station 505-*a* via communication link 550. Communication link 550 may be a S1-MME interface. Base station 510-*a* may be a gNB associated with a NR system. The P/SGW 540-*a* may communicate information to base station 510-*a* via communication link 550. Communication link 550 may be a S1-U interface. In some examples, base station 505-*a* and base station 510-*a* may transmit and receive information (e.g., that supports New Radio measurement and configuration) between one another via communication link 550.

In some cases, there may be a single S1-MME interface per UE which may be terminated at base station 505-*a*. This may be done to reduce a signaling overhead towards the EPC 530-*a* in cases of base station 510-*a* change. Data traffic of base station 505-*a* and base station 510-*a* may be aggregated and split at a higher level site, e.g., a router (not shown) between EPC 530-*a* and base station 505-*a* and base station 510-*a*. Base station 510-*a* may be provided with a dual-connectivity split bearer. In some examples, base station 505-*a* and base station 510-*a* may exchange data (i.e., transmit and receive) with UE 515-*a* based on the dual-connectivity split bearers. Dual-connectivity split bearers may be used by UE 515-*a*, base station 505-*a*, or base station 510-*a* for transmitting user or control data. In some cases, the dual-connectivity split bearers may be dedicated for particular data traffic (e.g., VoIP, broadband video streaming).

FIG. 5B illustrates an example of system 500-*b* that supports New Radio measurement and configuration in accordance with aspects of the present disclosure. EPC 530-*b* may be examples of core network 130 as described herein with reference to FIG. 1. EPC 530-*b* may include MME 535-*b* and P/SGW 540-*b*. MME 535-*b* may be a control node that processes signaling between UE 515-*b* and the EPC 530-*b*. P/SGW 540-*b* may include a packet data network gateway (P-GW) and a serving gateway (S-GW). In some examples, the P-GW and the S-GW may be separate and located at different locations. User IP packets may be transferred through the P/SGW 540-*b*.

Base station 505-*b* may be a eNB associated with a LTE system. The MME 535-*b* may communicate information to base station 505-*b* via communication link 550. Communication link 550 may be a S1-MME interface. Base station 510-*b* may be a gNB associated with a NR system. The P/SGW 540-*b* may communicate information to base station 510-*b* via communication link 550. Communication link 550 may be a S1-U interface. P/SGW 540-*b* may communicate information to base station 505-*b* with communication link 550, i.e., the S1-U interface. The information may include information that supports New Radio measurement and configuration, such as dual-connectivity master cell group (MCG) bearers or secondary cell group (SCG) bearers, or both. Data traffic of base station 505-*b* and base station 510-*b* may be aggregated and split at a higher level site, e.g., a router (not shown) between EPC 530-*b* and base station 505-*b* and base station 510-*b* based on the MCG bearers or SCG bearers, or both. Base station 505-*b* and base station 510-*b* may exchange data with UE 515-*b* based on the MCG bearers or SCG bearers.

FIG. 5C illustrates an example of system 500-*c* that supports New Radio measurement and configuration in accordance with aspects of the present disclosure. EPC 530-*c* may be examples of core network 130 as described herein with reference to FIG. 1. EPC 530-*c* may include MME 535-*c* and P/SGW 540-*c*. MME 535-*c* may be a control node that processes signaling between UE 515-*c* and the EPC 530-*c*. P/SGW 540-*c* may include a packet data network gateway (P-GW) and a serving gateway (S-GW). In some examples, the P-GW and the S-GW may be separate and located at different locations. User IP packets may be transferred through the P/SGW 540-*c*.

Base station 505-*c* may be a eNB associated with a LTE system. The MME 535-*c* may communicate information to base station 505-*c* via communication link 550. Communication link 550 may be a S1-MME interface. Base station 510-c may be a gNB associated with a NR system. The P/SGW 540-c may communicate information to base station 505-c via communication link 550. Communication link 550 may be a S1-U interface. The information may include information that supports New Radio measurement and configuration, such as dual-connectivity split secondary cell group (SCG) bearers. Base station 505-c may transmit the dual-connectivity split SCG bearers to base station 510-c via communication link 550. Data traffic of base station 505-c and base station 510-c may be aggregated and split at a higher level site, e.g., a router (not shown) between EPC 530-c and base station 505-c and base station 510-c based on the split bearers. Base station 505-c and base station 510-c may exchange data with UE 515-c based on the SCG bearers.

Figure 6A:
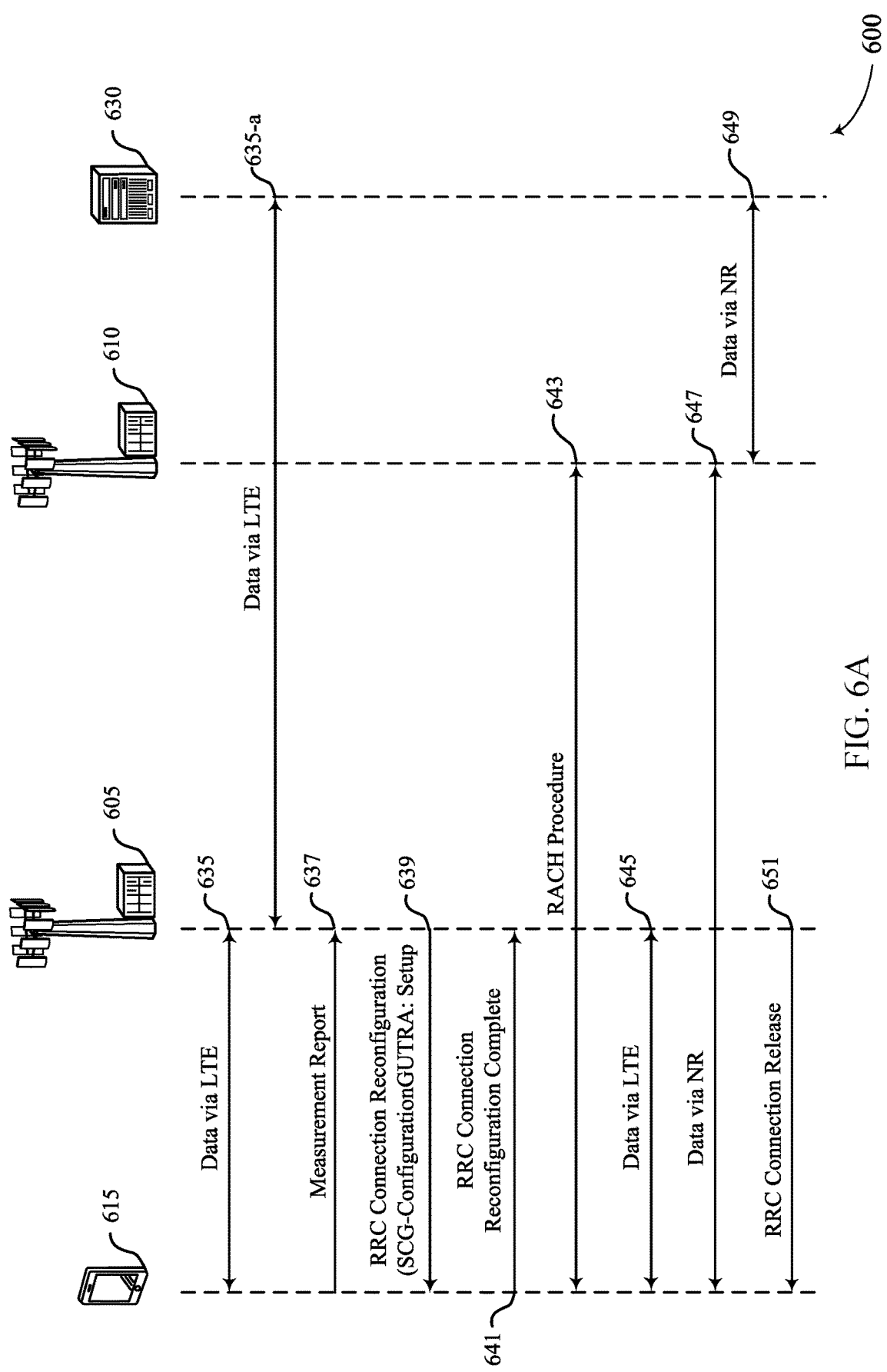
FIGS. 6A and 6B illustrate an example of a process flow that supports New Radio measurement and configuration in accordance with aspects of the present disclosure.
Figure 6B:
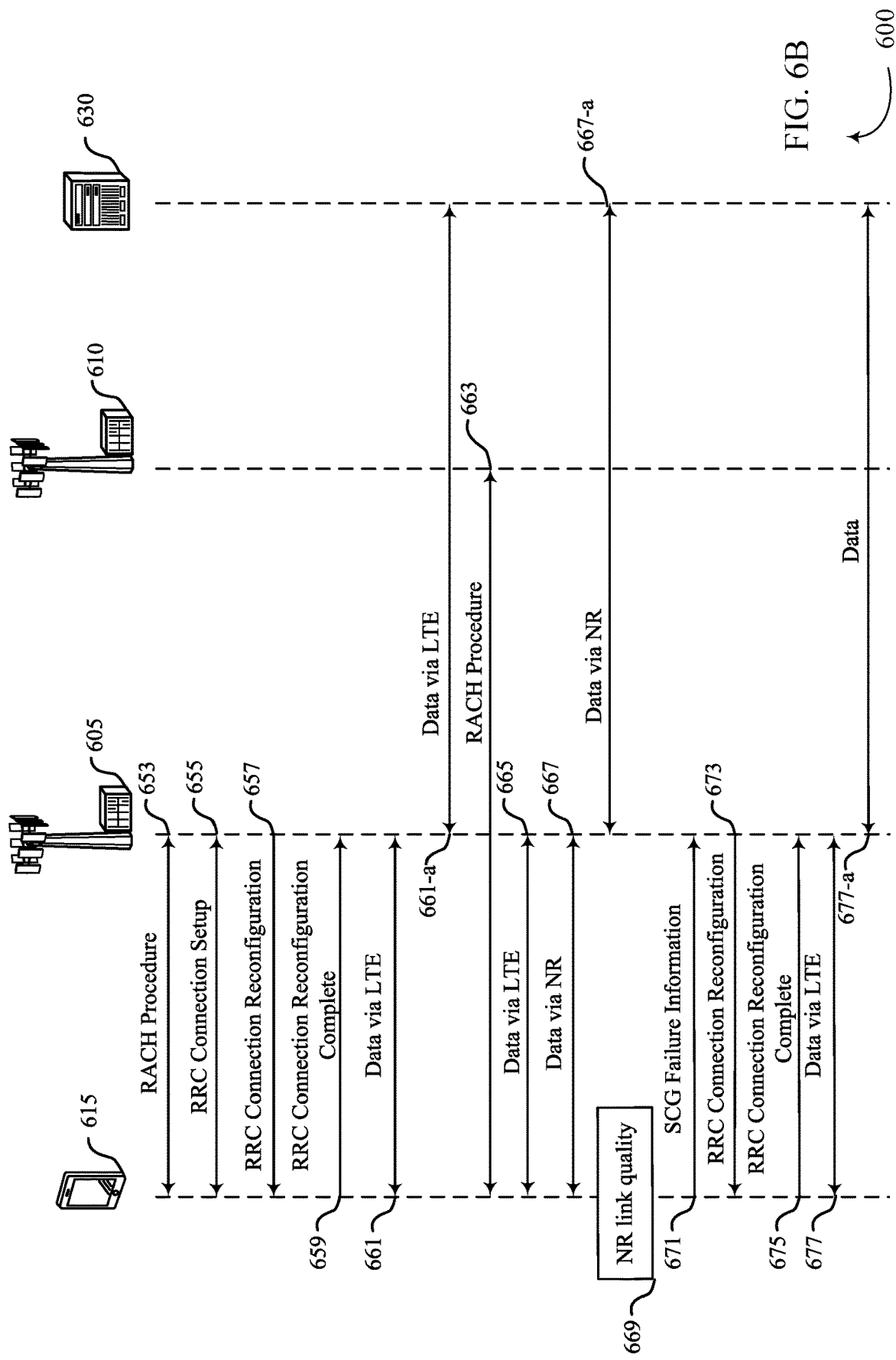

FIGS. 6A and 6B illustrate an example of a process flow 600 that supports New Radio measurement and configuration in accordance with aspects of the present disclosure. Process flow 600 may include UE 615, base station 605, base station 610, and core network 630. UE 615 may be examples of one or more UEs as described herein with reference to FIGS. 1-5. Base station 605 may be a eNB as described herein with reference to FIGS. 1-5. Base station 610 may be a gNB as described herein with reference to FIGS. 1-5. For example, base station 605 may be associated with a LTE system and base station 610 may be associated with a NR system. Core network 630 may be examples of a core network as described herein with reference to FIG. 1. Aspects of the following communication examples are described as occurring between UE 615, base station 605, base station 610, and core network 630.

Process flow 600 may be associated with a LTE-NR interworking network architecture with dual-connectivity and carrier aggregation. Process flow 600, in some cases, may be used to avoid issue associated with NR system coverage capability. UE 615 may have established a communication link with two network nodes (base stations 605 and base station 610) (e.g., a LTE network node and a NR network node) using dual-connectivity configuration or carrier aggregation, or both. When UE 615 is in a coverage area of the NR network node (i.e., base station 610), with both LTE and NR communication links configured, UE 615 may receive a RRC connection release message for the NR communication link, and UE 615 may need to reestablish a connection to the network node.

In some cases, reestablishing a connection with the NR network node (i.e., base station 610) may have a delay associated with it. If the network node (i.e. base station 605) establishes only an LTE communication link and postpones for the measurement report from UE 615 to indicate that UE 615 is in NR network node coverage area, prior to establishing a NR communication link may result in an increased delay for data throughput. In other words, there is a delay associated with UE 615 configuring the NR communication link which may affect data throughput at the initial RRC connection setup of the NR communication link. Process flow 600 may support reducing or eliminating the delay by having base station 605 setup both communication links (e.g., LTE and NR) as split bearer or SCG-bearer during the RRC connection setup when there is a NR network node (e.g., base station 610) in an LTE cell coverage area (e.g., base station 605).

At 635, UE 615 and base station 605 may exchange data via a first RAT communication link. The first RAT communication link may be a LTE communication link. UE 615 may transmit uplink data via the first RAT communication link to base station 605. Similarly, base station 605 may transmit downlink data via the first RAT communication link to UE 615. The data exchanged may include system information (e.g., inter-frequency configuration and measurement reporting configuration). In some examples, at 635-a, base station 605 may forward/transmit exchanged data with UE 615 to the core network 630.

At 637, UE 615 may transmit a measurement report to base station 605. In some examples, the measurement report may include information associated with base station 610. For example, UE 615 may transmit a NR communication link quality indicator associated with base station 610 in the measurement report. The NR communication link quality indicator may identify whether UE 615 is within a threshold coverage area of base station 610. Additionally or alternatively, the measurement report may include a reference signal received power (RSRP) indicator for the NR communication link or NR coverage area between UE 615 and base station 610.

At 639, base station 605 may transmit a RRC connection reconfiguration message to UE 615. The RRC connection reconfiguration message may include a SCG-configuration GUTRA:setup message. In some examples, the RRC connection reconfiguration message may include configuration information for PUSCH, PUCCH, physical downlink shared channel (PDSCH), channel quality indicator (CQI) reports, antenna configuration and scheduling requests. At 641, UE 615 may transmit a RRC connection reconfiguration complete message to base station 605. At 643, UE 615 may perform a RACH procedure with base station 610. Base station 610 may be associated with a second RAT (e.g., NR system). UE 615 may perform the RACH procedure with base station 610 to initiate data exchange with base station 610. In some examples, UE 615 may perform the RACH procedure with base station 610 to receive uplink timing information. In some examples, after the RACH procedure UE 615 may be configured for dual-connectivity or carrier aggregation, or both with base station 605 and base station 610.

At 645, UE 615 may exchange data with base station 605 via a LTE communication link. At 647, UE 615 may exchange data with base station 610 via a NR communication link. At 649, base station 610 may forward/transmit the exchanged data with UE 615 to core network 630. At 651, UE 615 may receive a RRC connection release message from base station 605. In some cases, UE 615 may receive the RRC connection release message due to UE 615 being in a RRC idle mode or RRC inactive mode. In some examples, UE 615 may receive the RRC connection release message due to an expiration of an inactivity timer.

At 653, UE 615 may perform a RACH procedure with base station 605. At 655, UE 615 and base station 605 may establish a RRC connection setup. At 657, base station 605 may transmit a RRC connection reconfiguration message to UE 615. At 659, UE 615 may in response to the RRC connection reconfiguration message, transmit a RRC connection reconfiguration complete message to base station 605. As a result, UE 615 and base station 605 may have a reestablished communication link. At 661, UE 615 may exchange data with base station 605 on the reestablished communication link between UE 615 and base station 605. At 661-a, base station 605 may forward/transmit the exchanged data between UE 615 and itself to core network 630.

At 663, UE 615 may perform a RACH procedure with base station 610. At 665, UE 615 may continue to exchange data with base station 605 via communication link (e.g., LTE communication link) between UE 615 and base station 605. At 667, UE 615 may exchange data with base station 610 via another communication link (e.g., NR communication link). At 667-*a*, base station 610 may forward/transmit the exchanged data between UE 615 and itself to core network 630.

At 669, UE 615 may determine whether the communication link between itself and base station 610 (i.e., NR communication link) satisfies a threshold value. UE 615 may determine that it is not within a healthy coverage area of base station 610 based on the quality of the communication link. If UE 615 determines that the communication link is below the threshold value, UE 615 may transmit, at 671, a SCG failure information message to base station 605. The SCG failure information message may be transmitted in a RRC message. The network may release the communication link between UE 615 and base station 610 based on the received SCG failure information message.

At 673, base station 605 may transmit a RRC connection reconfiguration message to UE 615. At 675, UE 615 may transmit a RRC connection reconfiguration complete message to base station 605. Based on the RRC connection reconfiguration complete message, UE 615 may, at 677, exchange data with base station 605. At 677-*a*, base station 605 may forward/transmit the exchanged data to core network 630. As a result, process flow 600 may support speeding up the setup of a communication link at the LTE network node (i.e., base station 605) when a connection release message is received for a communication link at the NR network node, while maintaining a high data throughput.

Figure 7A:
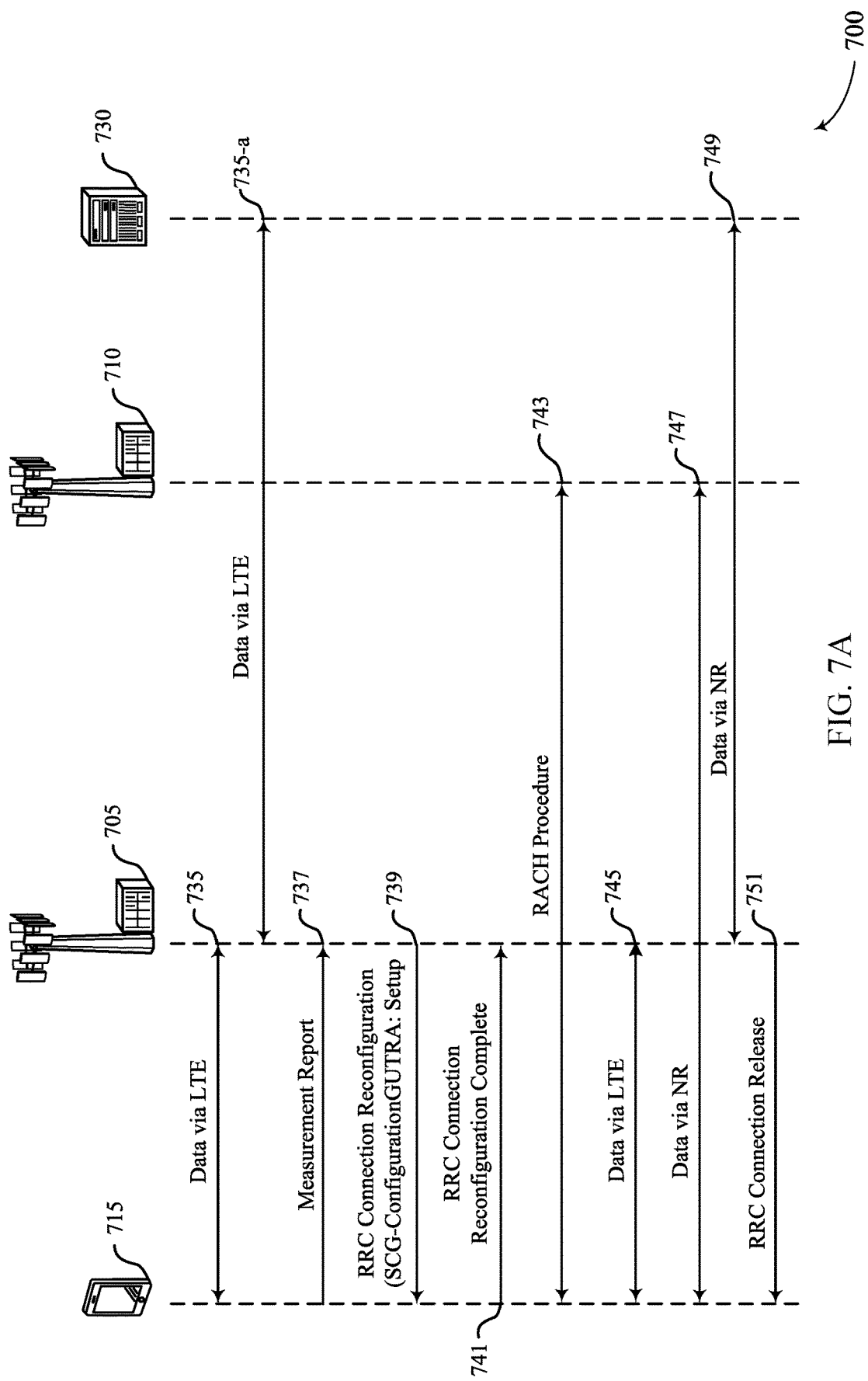
FIGS. 7A and 7B illustrate an example of a process flow that supports New Radio measurement and configuration in accordance with aspects of the present disclosure.
Figure 7B:
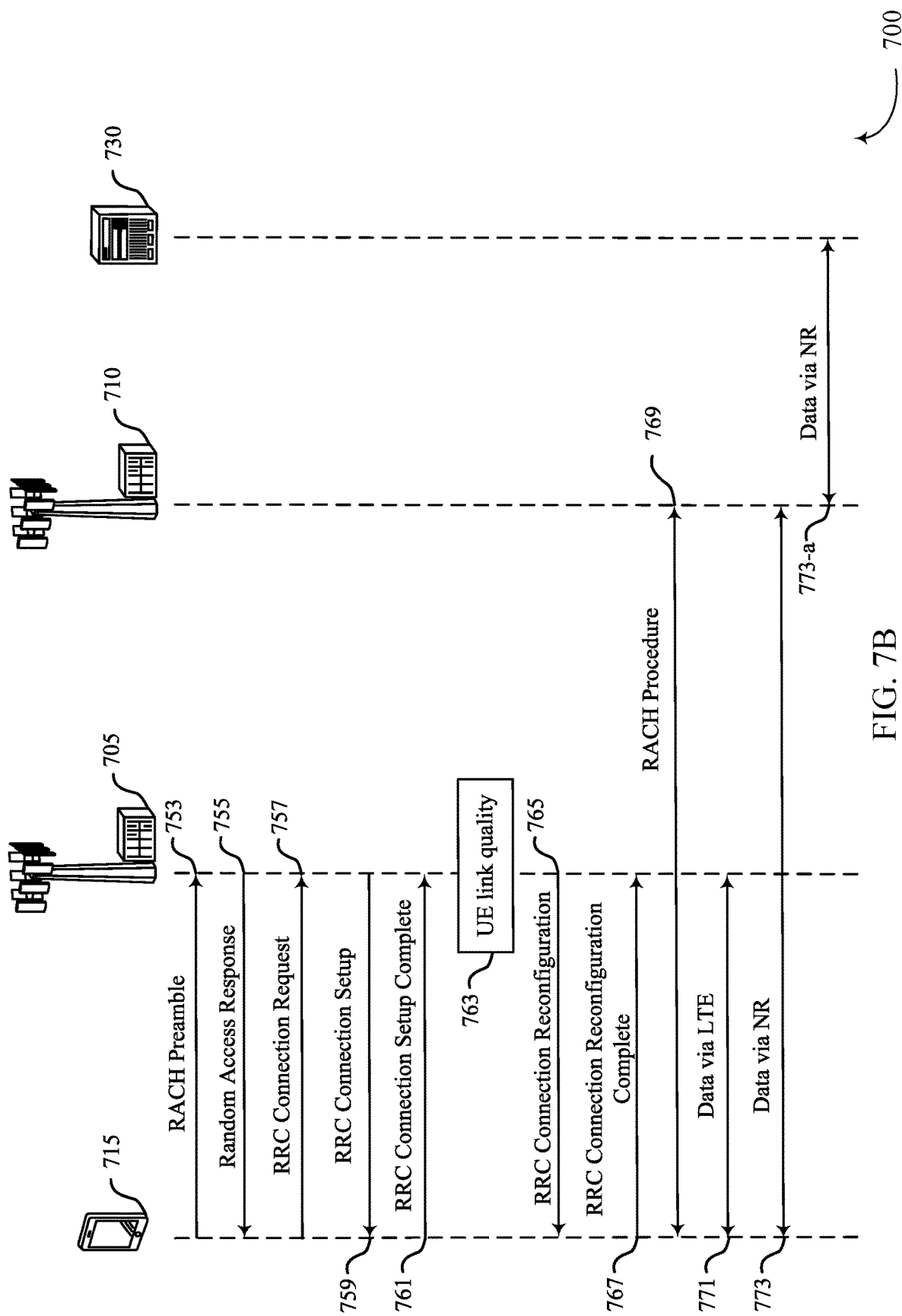

FIGS. 7A and 7B illustrate an example of a process flow 700 that supports New Radio measurement and configuration in accordance with aspects of the present disclosure. Process flow 700 may include UE 715, base station 705, base station 710, and core network 730. UE 715 may be examples of one or more UEs as described herein with reference to FIGS. 1-6. Base station 705 may be a eNB as described herein with reference to FIGS. 1-6. Base station 710 may be a gNB as described herein with reference to FIGS. 1-6. For example, base station 705 may be associated with a LTE system and base station 710 may be associated with a NR system. Core network 730 may be an example of a core network as described herein with reference to FIG. 1. Aspects of the following communication examples are described as occurring between UE 715, base station 705, base station 710, and core network 730.

Process flow 700 may be associated with an LTE-NR interworking network architecture with carrier aggregation and dual-connectivity. Process flow 700, in some cases, may be used to avoid issues associated with NR systems coverage capability. UE 715 may have established a communication link with two network nodes (base stations 705 and base station 710) (e.g., LTE network node and NR network node) using dual-connectivity configuration. When UE 715 is in a coverage area of the NR network node, with both LTE and NR communication links configured, UE 715 may receive a RRC connection release message for the NR communication link. UE 715 may reestablish a connection to the NR network node in response to the RRC connection release message. In some cases, reestablishing a connection with the NR network node (i.e., base station 715) may have a delay associated with it. For example, if the network node (i.e. base station 705) establishes an LTE communication link and postpones the measurement report from UE 715, prior to establishing a NR communication link, may result in an increased delay for data throughput. In other words, there is a delay associated with UE 715 configuring the NR communication link which may affect data throughput at the initial RRC connection setup of the NR communication link. Process flow 700 may, however, support reducing or eliminating the delay.

At 735, UE 715 and base station 705 may exchange data via a first RAT communication link. The first RAT communication link may be a LTE communication link. UE 715 may transmit uplink data via the first RAT communication link to base station 705. Similarly, base station 705 may transmit downlink data via the first RAT communication link to UE 715. The data exchanged may include system information (e.g., inter-frequency configuration and measurement reporting configuration). In some examples, at 735-*a*, base station 705 may forward/transmit exchanged data with UE 715 to the core network 730.

At 737, UE 715 may transmit a measurement report to base station 705. In some examples, the measurement report may include information associated with base station 710. For example, UE 715 may transmit a NR communication link quality indicator associated with base station 710 in the measurement report. The NR communication link quality indicator may identify whether UE 715 is within a threshold coverage area of base station 710. The measurement report may include a RSRP indicator for the NR communication link or NR coverage area between UE 715 and base station 710.

At 739, base station 705 may transmit a RRC connection reconfiguration message to UE 715. The RRC connection reconfiguration message may include a SCG-configuration GUTRA:setup message. In some examples, the RRC connection reconfiguration message may include configuration information for PUSCH, PUCCH, PDSCH physical channels, CQI reports, antenna configuration and scheduling requests. At 741, UE 715 may transmit a RRC connection reconfiguration complete message to base station 705. At 743, UE 715 may perform a RACH procedure with base station 710. Base station 710 may be associated with a second RAT (e.g., NR system). UE 715 may perform the RACH procedure with base station 710 to initiate data exchange with base station 710. In some examples, UE 715 may perform the RACH procedure with base station 710 to receive uplink timing information. In some examples, after the RACH procedure UE 715 may be configured for dual-connectivity or carrier aggregation, or both with base station 705 and base station 710.

At 745, UE 715 may exchange data with base station 705 via a LTE communication link. At 747, UE 715 may exchange data with base station 710 via a NR communication link. At 749, base station 710 may forward/transmit the exchanged data with UE 715 to core network 730. At 751, UE 715 may receive a RRC connection release message from base station 705. In some cases, UE 715 may receive the RRC connection release message due to UE 715 being in a RRC idle mode or RRC inactive mode. In some examples, UE 715 may receive the RRC connection release message due to an expiration of an inactivity timer.

At 753, UE 715 may transmit a RACH preamble to base station 705. That is, UE 715 may initiate a session with base station 705 using a random access radio network temporary identifier (RA-RNTI) based on the RACH preamble. At 755, base station 705 may transmit a random access response to UE 715 based on to the RACH preamble. At 757, UE 715 may transmit a RRC connection request message to base station 705. The RRC connection request message may indicate whether UE 715 is in a healthy coverage area of base station 710. Additionally or alternatively, the RRC connection request message may include a physical cell identity (PCI) associated with base station 710, or an RSRP value associated with base station 710, or both.

At 759, base station 705 may transmit a RRC connection setup message to UE 715. At 761, UE 715 may transmit a RRC connection setup complete message to base station 705. The RRC connection setup complete message may include a parameter that may indicate whether UE 715 is in a healthy coverage area of base station 710. In some examples, prior to or once UE 715 establishes a connection with base station 705, UE 715 may measure one or more frequencies/signals associated with base station 710 by using previous measurement configuration, before receiving the RRC connection release message. Alternatively, UE 715 may measure one or more frequencies/signals associated with base station 710 based on inter-frequency configuration information received in a SIB from base station 705.

At 763, base station 705 may determine whether a communication link quality between base station 710 and UE 715 satisfies a threshold value (e.g. QoS, RSSI, CQI). For example, the information for determining the communication link quality between base station 710 and UE 715 satisfies the threshold may be based on the indication from the UE received at 757 or 761 (e.g., a message received in an RRC connection procedure). If base station 705 determines that the communication link quality between base station 710 and UE 715 is below the threshold value, base station 705 may at 765, transmit a RRC connection reconfiguration message to UE 715. The RRC connection reconfiguration message may include one or more MCG radio bearers. Alternatively, if base station 705 determines that the communication link quality between base station 710 and UE 715 satisfies the threshold value or is above the threshold value, base station 705 may transmit a RRC connection reconfiguration message that may include one or more MCG radio bearers, a SCG-configuration GUTRA: setup message, or both.

At 767, UE 715 may transmit a RRC connection reconfiguration complete message to base station 705. At 769, UE 715 and base station 710 may perform a RACH procedure. At 771, UE 715 may exchange data with base station 710. The data may include uplink data or downlink data, or both. At 773, UE 715 may exchange data with base station 710. Similarly, the data may include uplink data or downlink data, or both. At 773-a, base station 710 may forward/transmit the exchanged data to core network 730. As a result, process flow 700 may support speeding up the setup of a broadband communication link at the NR network node (i.e., base station 710) while maintaining a high data throughput.

Figure 8:
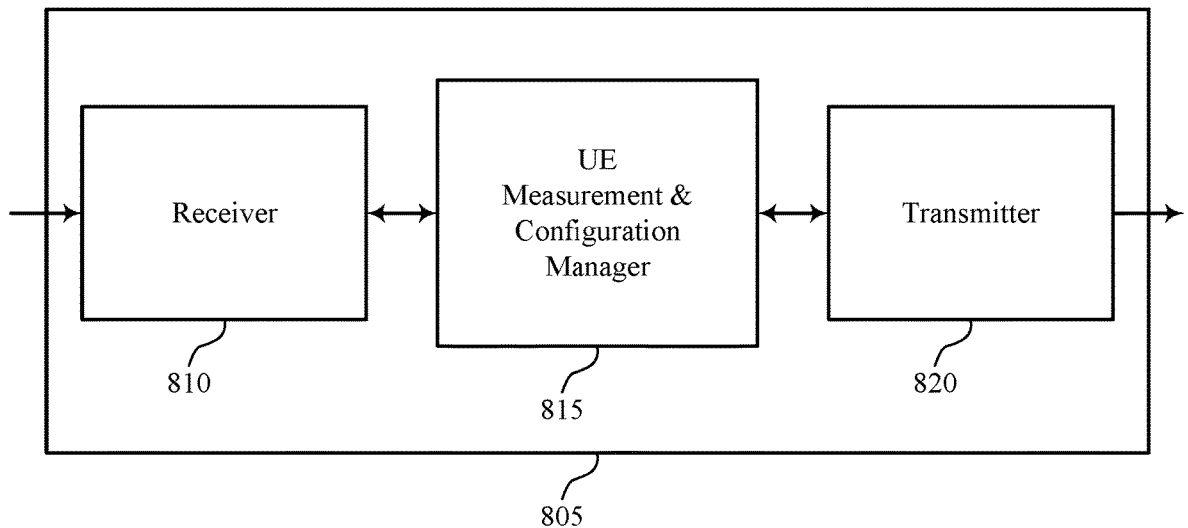
FIGS. 8 through 10 show block diagrams of a device that supports New Radio measurement and configuration in accordance with aspects of the present disclosure.

FIG. 8 shows a block diagram 800 of a wireless device 805 that supports New Radio measurement and configuration in accordance with aspects of the present disclosure. Wireless device 805 may be an example of aspects of a UE 115 as described with reference to FIGS. 1-7. Wireless device 805 may include receiver 810, UE measurement and configuration manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to New Radio measurement and configuration, etc.). Information may be passed on to other components of the device. The receiver 810 may be an example of aspects of the transceiver 1135 described with reference to FIG. 11. The receiver 810 may utilize a single antenna or a set of antennas.

Receiver 810 may receive system information from a first network node. The system information may include inter-frequency configuration and measurement reporting configuration. In some cases, receiver 810 may receive, from the first network node, a system information block (SIB) including the inter-frequency configuration or the measurement reporting configuration, or both. The receiver 810 may receive the system information during a radio resource control (RRC) idle mode or a RRC inactive mode, or both. Additionally or alternatively, receiver 810 may receive configuration of a first radio access technology (RAT) or the second RAT, or both from the first network node.

In some examples, receiver 810 may receive, in response to a RRC connection procedure, a secondary cell group (SCG) configuration from the first network node. The receiver 810 may also receive, from the first network node, instructions to allocate a secondary cell based on the SCG configuration. In some cases, receiver 810 may receive secondary cell capability information from the first network node. The secondary cell capability information may indicate one or more frequencies available for communication with a second network node of the secondary cell. Alternatively, the receiver 810 may receive a SCG configuration associated with the second network node based on a random access channel (RACH) procedure message. In some examples, receiver 810 may receive, from the first network node, a RRC connection reconfiguration message including a SCG configuration release message, and receive a random access response message from the first network node based on a RACH preamble.

UE measurement and configuration manager 815 and/or at least some of its various sub-components may be implemented in hardware, software executed by a processor, firmware, or any combination thereof. If implemented in software executed by a processor, the functions of the UE measurement and configuration manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE measurement and configuration manager 815 and/or at least some of its various sub-components may be physically located at various positions, including being distributed such that portions of functions are implemented at different physical locations by one or more physical devices. In some examples, UE measurement and configuration manager 815 and/or at least some of its various sub-components may be a separate and distinct component in accordance with various aspects of the present disclosure. In other examples, UE measurement and configuration manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE measurement and configuration manager 815 may perform a measurement of one or more frequencies associated with the inter-frequency configuration. Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Transmitter 820 may transmit a report of the measurement of the one or more frequencies to the first network node during a RRC connection procedure based on the measurement reporting configuration. In some cases, transmitter 820 may transmit, to the first network node, a message rejecting the allocation of the secondary cell. Transmitter 820 may also transmit a RRC connection reconfiguration complete message to the first network node.

In some examples, transmitter 820 may transmit a SCG failure information message to the first network node. Additionally or alternatively, transmitter may transmit a RACH preamble to the first network node, and transmit a RRC connection request message including a physical cell identity (PCI) associated with the second network node in a medium access control (media access control (MAC)) control element (CE) to the first network node based on the received random access response message.

Figure 9:
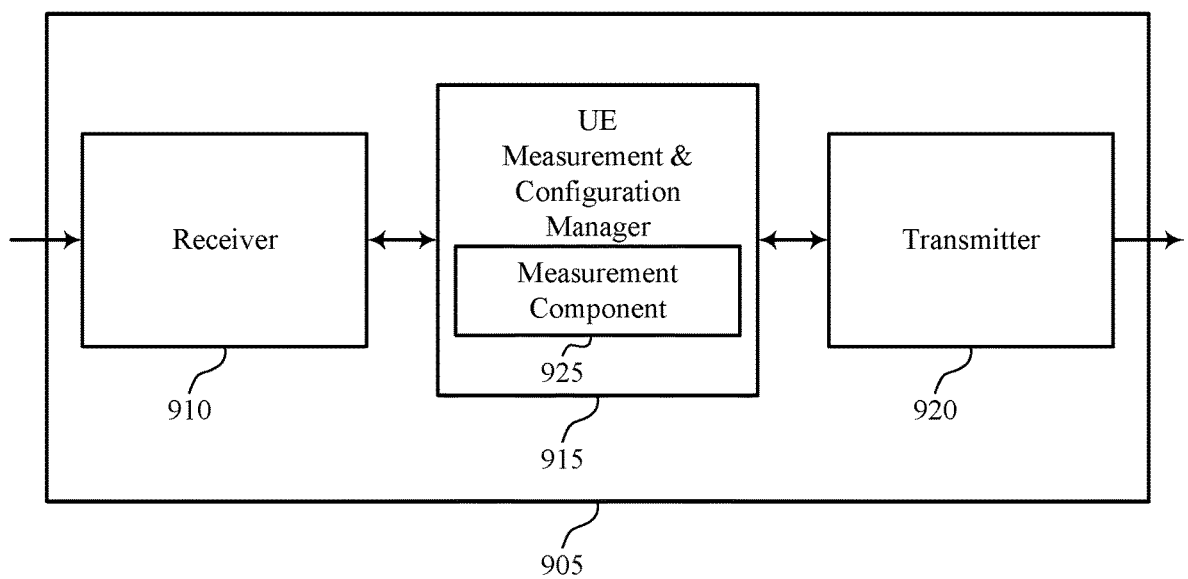

FIG. 9 shows a block diagram 900 of a wireless device 905 that supports n New Radio measurement and configuration in accordance with aspects of the present disclosure. Wireless device 905 may be an example of aspects of a wireless device 805 or a UE 115 as described with reference to FIGS. 1-8. Wireless device 905 may include receiver 910, UE measurement and configuration manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to New Radio measurement and configuration, etc.). Information may be passed on to other components of the device. The receiver 910 may be an example of aspects of the transceiver 1135 described with reference to FIG. 11. The receiver 910 may utilize a single antenna or a set of antennas.

UE measurement and configuration manager 915 may be an example of aspects of the UE measurement and configuration manager 815 described with reference to FIG. 8. UE measurement and configuration manager 915 may also include measurement component 925. The measurement component 925 may perform a measurement of one or more frequencies associated with the inter-frequency configuration. Additionally or alternatively, measurement component 925 may measure the one or more frequencies associated with the inter-frequency configuration during a RRC idle mode or a RRC inactive mode, or both. The measurement component 925 may measure one or more frequencies of a first RAT during the RRC idle mode or the RRC inactive mode, or both, and measure one or more frequencies of a second RAT during the RRC idle mode or the RRC inactive mode, or both. In some cases, the RRC connection procedure includes a RRC establishment procedure or a RRC connection resume procedure, or both. In some cases, the one or more frequencies are associated with one or more radio access technologies (RATs) including a LTE system or NR system, or both.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
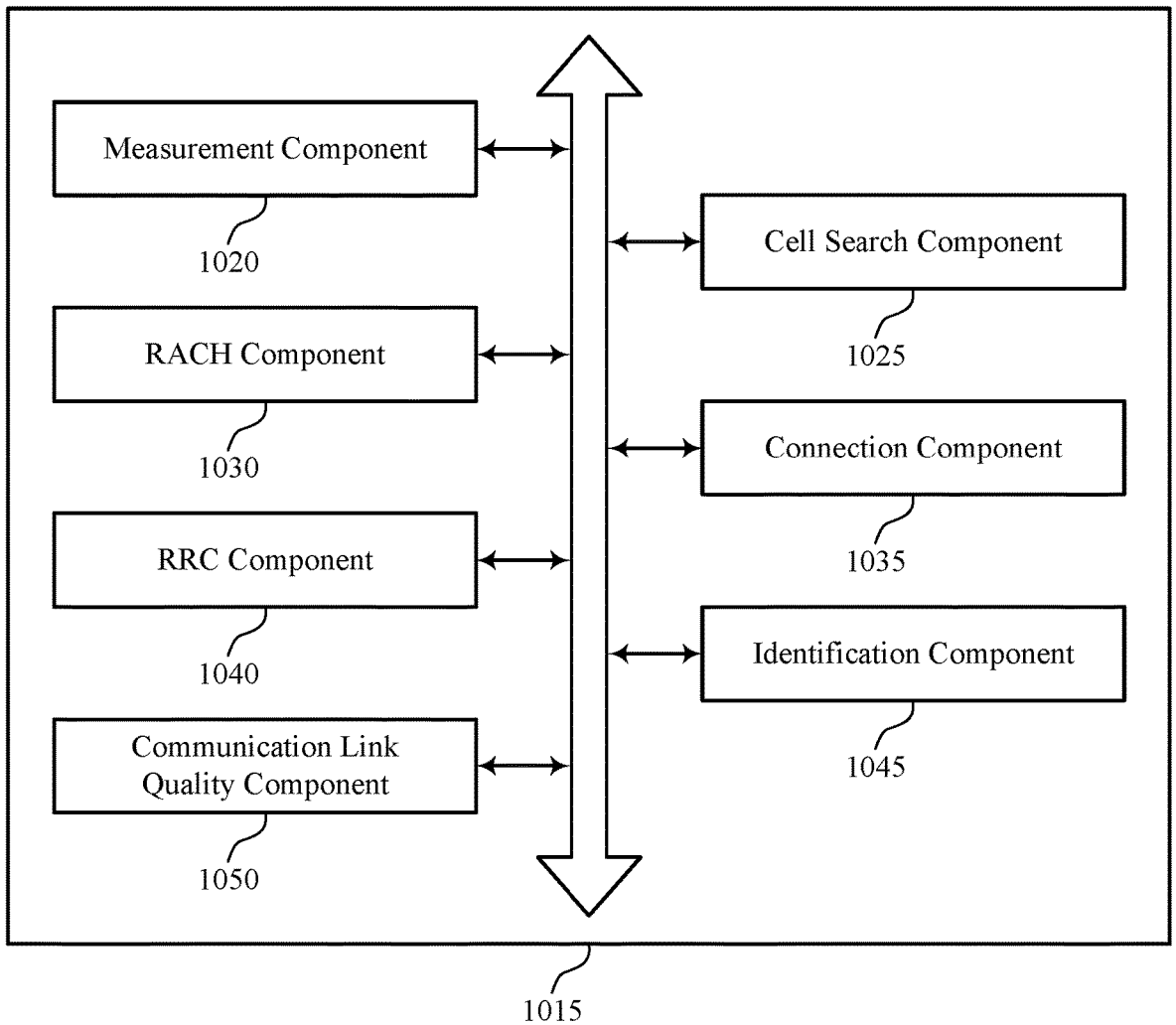

FIG. 10 shows a block diagram 1000 of a UE measurement and configuration manager 1015 that supports New Radio measurement and configuration in accordance with aspects of the present disclosure. The UE measurement and configuration manager 1015 may be an example of aspects of a UE measurement and configuration manager 1015, a UE measurement and configuration manager 1015, or a UE measurement and configuration manager 1015 described with reference to FIGS. 8 and 9. The UE measurement and configuration manager 1015 may include measurement component 1020, cell search component 1025, RACH component 1030, connection component 1035, RRC component 1040, identification component 1045, and communication link quality component 1050. Each of these modules may communicate, directly or indirectly, with one another (e.g., via one or more buses).

Measurement component 1020 may perform a measurement of one or more frequencies associated with the inter-frequency configuration. In some examples, measurement component 1020 may measure the one or more frequencies associated with the inter-frequency configuration during a RRC idle mode or a RRC inactive mode, or both. The measurement component 1020 may measure one or more frequencies of a first RAT during the RRC idle mode or the RRC inactive mode, or both, and measure one or more frequencies of a second RAT during the RRC idle mode or the RRC inactive mode, or both. In some cases, the RRC connection procedure includes a RRC establishment procedure or a RRC connection resume procedure, or both. In some cases, the one or more frequencies are associated with one or more radio access technologies (RATs) including a LTE system or a NR system, or both.

Cell search component 1025 may perform a cell search on the one or more frequencies. In some examples, performing the measurement of the one or more frequencies during the RRC idle mode or the RRC inactive mode, or both, is subsequent to the cell search. RACH component 1030 may perform a RACH procedure with the second network node of the secondary cell, in response to the RRC connection procedure with the first network node of a primary cell. In some examples, RACH component 1030 may perform a RACH procedure directly with the second network node of the secondary cell, in response to a radio link failure with the second network node of the secondary cell. As a result, a UE may connect directly to the secondary cell group without going through the primary cell. RACH component 1030 may perform a RACH procedure or an initial attach procedure with the first network node based on a received RRC connection release message, and perform a RACH procedure with a second network node of a secondary cell. In some cases, the primary cell includes an LTE system or a NR system. In some cases, the secondary cell includes an LTE system or an NR system. In some cases, the RACH procedure message includes a request to establish a connection with the second network node.

Connection component 1035 may establish a connection to the second network node based on the SCG configuration. In some examples, establishing the connection to the second network node includes releasing a connection associated with the first network node. RRC component 1040 may perform the RRC connection procedure with the first network node in response to the RACH procedure or the initial attach procedure and receive a RRC connection reconfiguration message from the first network node. Identification component 1045 may identify one or more master cell group (MCG) bearers or an SCG configuration setup message, or both, based on the RRC connection reconfiguration message, where the MCG is associated with the primary cell. Communication link quality component 1050 may determine that a communication link quality between the UE and the second network node is below a threshold value.

Figure 11:
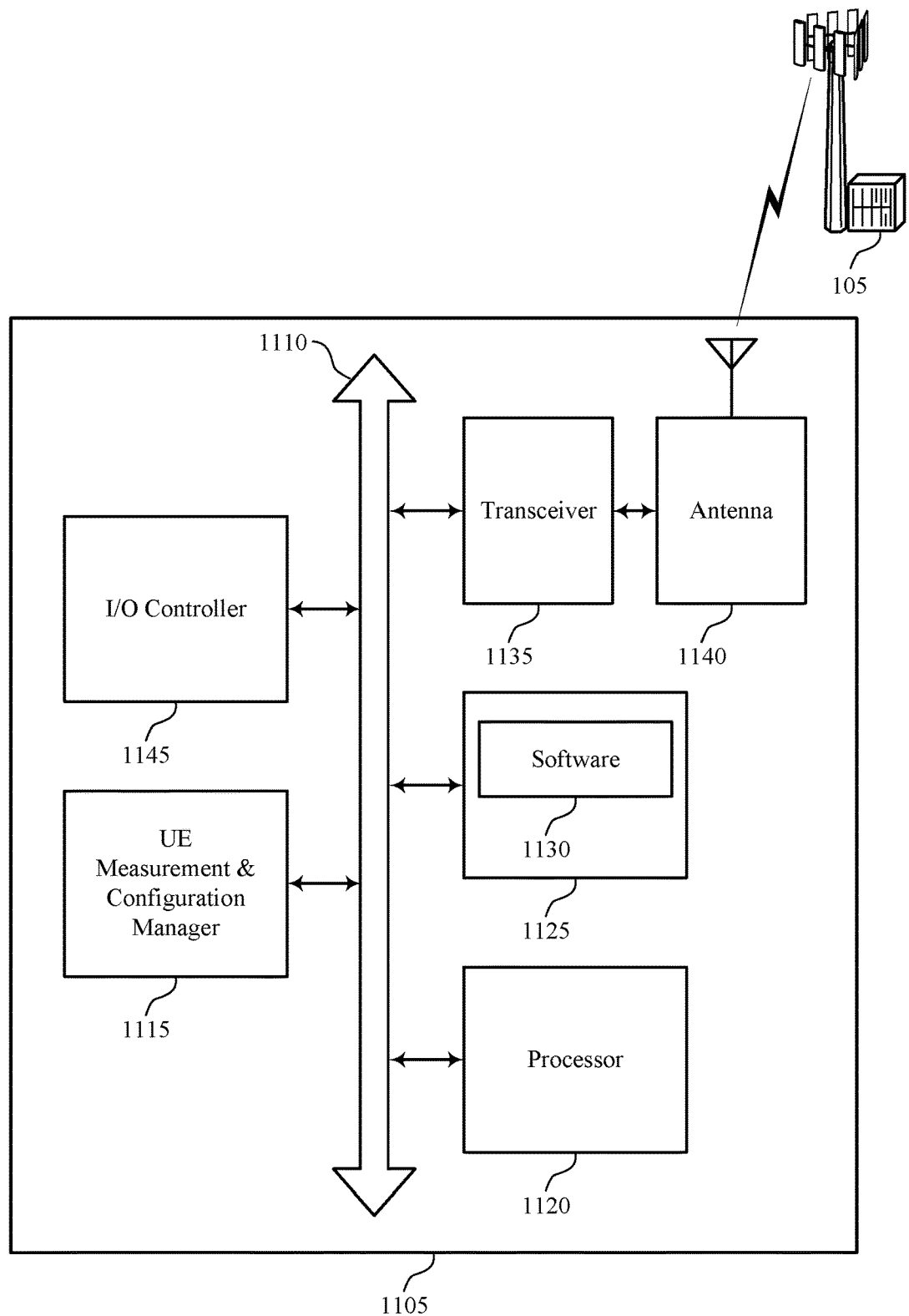
FIG. 11 illustrates a block diagram of a system including a UE that supports New Radio measurement and configuration in accordance with aspects of the present disclosure.

FIG. 11 shows a diagram of a system 1100 including a device 1105 that supports New Radio measurement and configuration in accordance with aspects of the present disclosure. Device 1105 may be an example of or include the components of wireless device 805, wireless device 905, or a UE 115 as described above, e.g., with reference to FIGS. 1, 8 and 9. Device 1105 may include components for bi-directional voice and data communications including components for transmitting and receiving communications, including UE measurement and configuration manager 1115, processor 1120, memory 1125, software 1130, transceiver 1135, antenna 1140, and I/O controller 1145. These components may be in electronic communication via one or more busses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting New Radio measurement and configuration).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices. Software 1130 may include code to implement aspects of the present disclosure, including code to support New Radio measurement and configuration. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
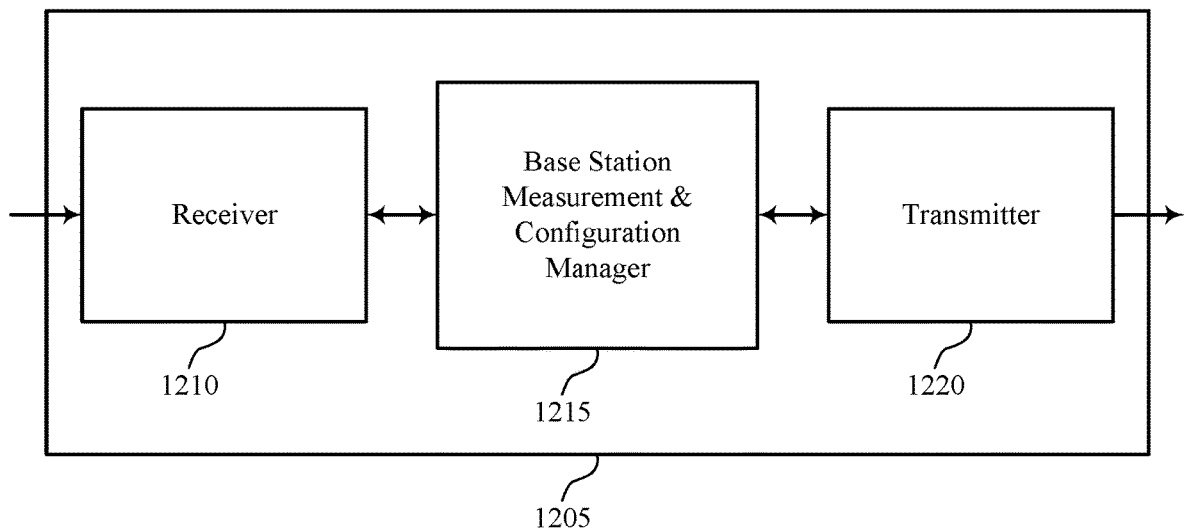
FIGS. 12 through 14 show block diagrams of a device that supports New Radio measurement and configuration in accordance with aspects of the present disclosure.

FIG. 12 shows a block diagram 1200 of a wireless device 1205 that supports New Radio measurement and configuration in accordance with aspects of the present disclosure. Wireless device 1205 may be an example of aspects of a base station 105 as described with reference to FIG. 1. Wireless device 1205 may include receiver 1210, base station measurement and configuration manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to New Radio measurement and configuration, etc.). Information may be passed on to other components of the device. The receiver 1210 may be an example of aspects of the transceiver 1535 described with reference to FIG. 15. The receiver 1210 may utilize a single antenna or a set of antennas. Receiver 1210 may receive, from the UE, a report including a measurement of one or more frequencies associated with an inter-frequency configuration during a RRC establishment procedure.

Base station measurement and configuration manager 1215 and/or at least some of its various sub-components may be implemented in hardware, software executed by a processor, firmware, or any combination thereof. If implemented in software executed by a processor, the functions of the base station measurement and configuration manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station measurement and configuration manager 1215 and/or at least some of its various sub-components may be physically located at various positions, including being distributed such that portions of functions are implemented at different physical locations by one or more physical devices. In some examples, base station measurement and configuration manager 1215 and/or at least some of its various sub-components may be a separate and distinct component in accordance with various aspects of the present disclosure. In other examples, base station measurement and configuration manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station measurement and configuration manager 1215 may generate a system information message including inter-frequency configuration and measurement reporting configuration. The base station measurement and configuration manager 1215 may also receive, from a UE, a RACH procedure message including a secondary cell group (SCG) addition request to associate the network node as a secondary cell of the UE and perform an SCG addition procedure with a second network node based on the addition request. In some cases, the second network node may be a primary cell of the UE.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas. Transmitter 1220 may transmit the system information message to a UE. In some examples, transmitter 1220 may transmit, to the UE, an indication of one or more MCG bearers in a RRC connection reconfiguration message. Additionally or alternatively, transmitter 1220 may transmit, to the UE, the indication of the one or more MCG bearers and an SCG configuration setup message in the RRC connection reconfiguration message based on the determining.

Figure 13:
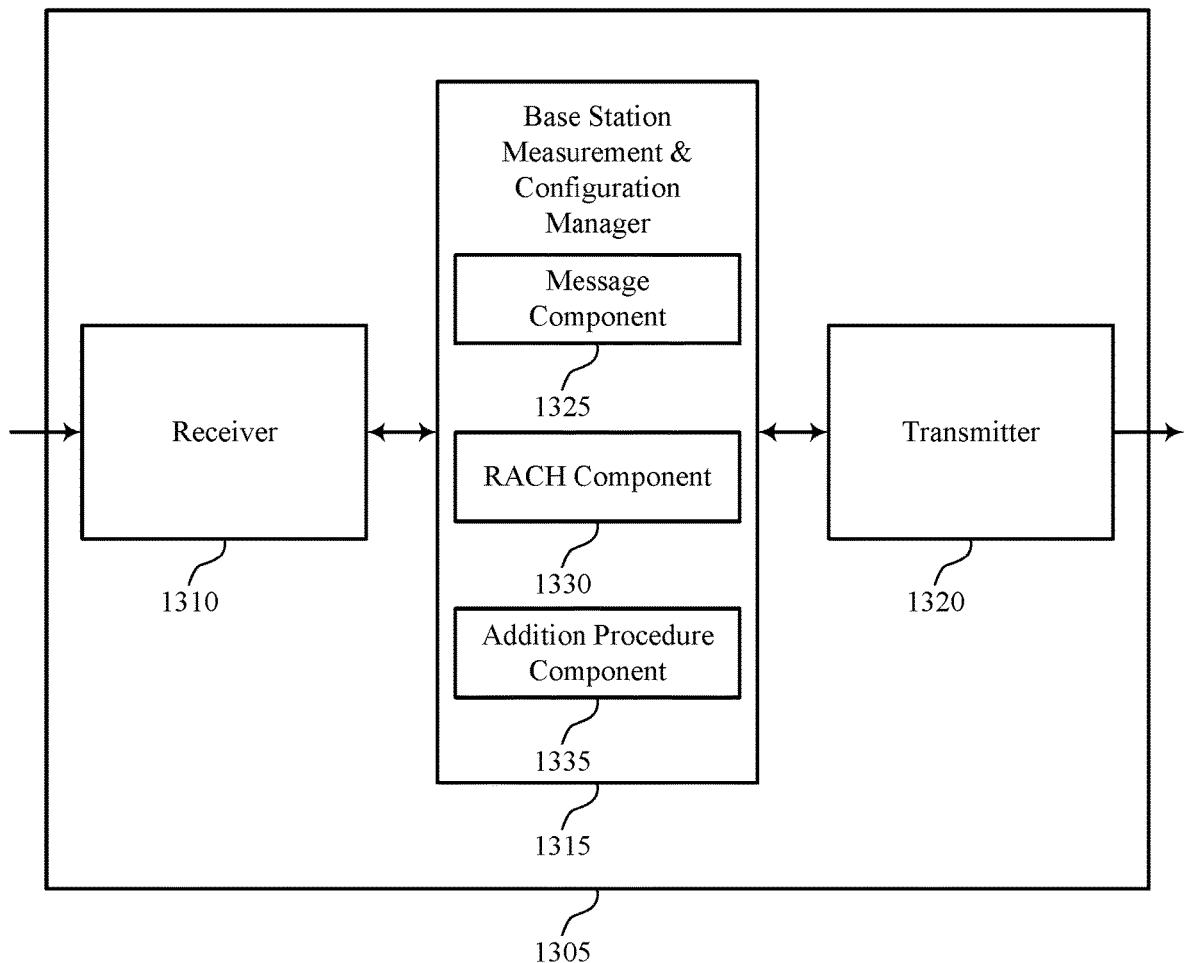

FIG. 13 shows a block diagram 1300 of a wireless device 1305 that supports New Radio measurement and configuration in accordance with aspects of the present disclosure. Wireless device 1305 may be an example of aspects of a wireless device or a base station as described with reference to FIGS. 1 through 5 and 12 through 15. Wireless device 1305 may include receiver 1310, base station measurement and configuration manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to New Radio measurement and configuration, etc.). Information may be passed on to other components of the device. The receiver 1310 may be an example of aspects of the transceiver 1535 described with reference to FIG. 15. The receiver 1310 may utilize a single antenna or a set of antennas.

Base station measurement and configuration manager 1315 may be an example of aspects of the base station measurement and configuration manager 1215 described with reference to FIG. 12. Base station measurement and configuration manager 1315 may also include message component 1325, RACH component 1330, and addition procedure component 1335.

Message component 1325 may generate a system information message including inter-frequency configuration and measurement reporting configuration. In some cases, message component 1325 may transmit, to a UE, a SIB message including the inter-frequency configuration or the measurement reporting configuration, or both. Additionally or alternatively, message component 1325 may receive, from the UE, a RRC connection request message including link information of a second network node and a physical cell identity (PCI) in a medium access control (MAC) control element (CE) associated with a second network node during a RRC establishment procedure. In some cases, the network node is associated with a primary cell of a first RAT. In some cases, the second network node is associated with a secondary cell of a second RAT. In some cases, the first RAT and the second RAT are different.

RACH component 1330 may receive, from the UE, a RACH procedure message including a secondary cell group (SCG) addition request to associate the network node as a secondary cell of the UE. In some cases, the UE may be in a RRC connected mode with a network node of a primary cell. In some cases, the network node may be associated with a secondary cell. Addition procedure component 1335 may perform a second network addition procedure associated with the second network node based on transmitting an addition procedure message to the second network node and perform an SCG addition procedure with a second network node based on the addition request. In some cases, the second network node may be a primary cell of the UE.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
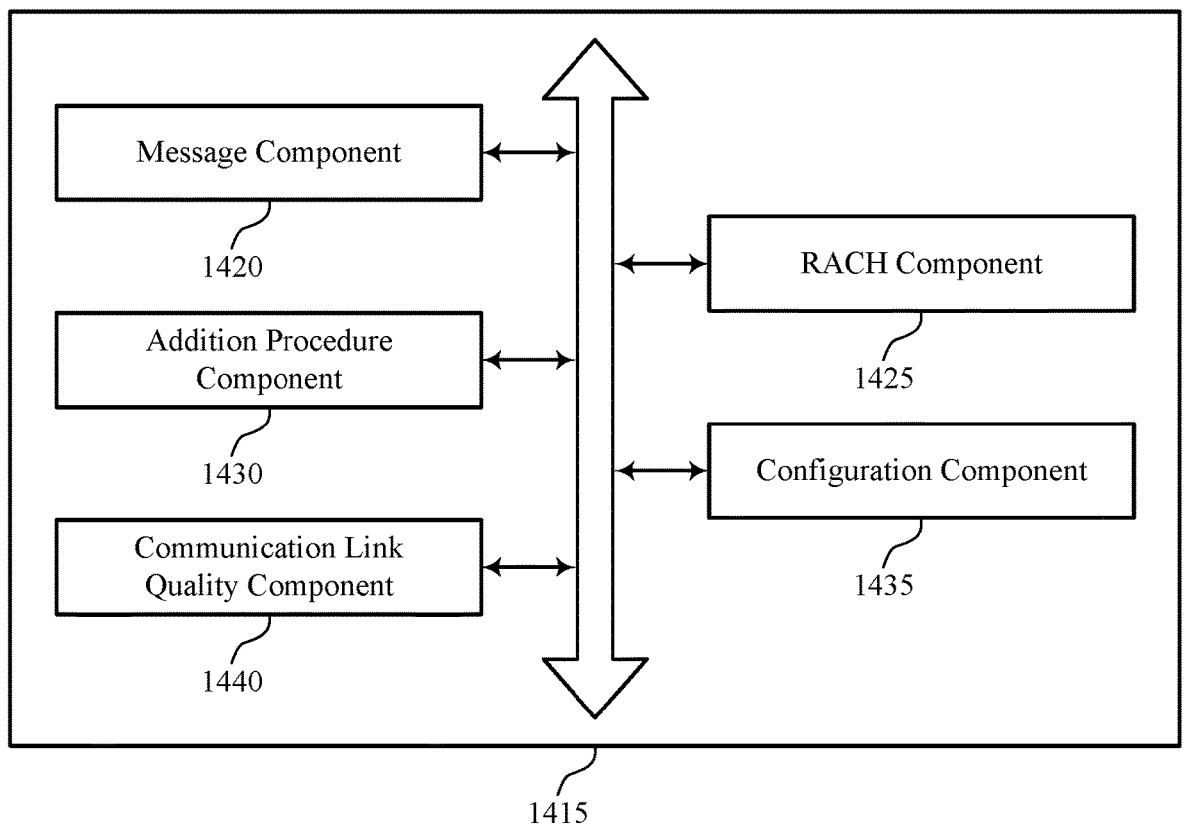

FIG. 14 shows a block diagram 1400 of a base station measurement and configuration manager 1415 that supports New Radio measurement and configuration in accordance with aspects of the present disclosure. The base station measurement and configuration manager 1415 may be an example of aspects of a base station measurement and configuration manager 1415 described with reference to FIGS. 12, 13, and 15. The base station measurement and configuration manager 1415 may include message component 1420, RACH component 1425, addition procedure component 1430, configuration component 1435, and communication link quality component 1440. Each of these modules may communicate, directly or indirectly, with one another (e.g., via one or more buses).

Message component 1420 may generate a system information message including inter-frequency configuration and measurement reporting configuration. In some cases, the message component 1420 may transmit to a UE a SIB message including the inter-frequency configuration or the measurement reporting configuration, or both. The message component 1420 may receive, from the UE, a RRC connection request message including link information of a second network node and a physical cell identity (PCI) in a medium access control (MAC) control element (CE) associated with the second network node during a RRC establishment procedure. In some cases, the network node is associated with a primary cell of a first RAT. In some cases, the second network node is associated with a secondary cell of a second RAT. Additionally or alternatively, the first RAT and the second RAT are different.

RACH component 1425 may receive, from the UE, a RACH procedure message including a secondary cell group (SCG) addition request to associate the network node as a secondary cell of the UE. In some cases, the UE is a RRC connected mode with a network node of a primary cell. Additionally or alternatively, in some cases, the network node is associated with a secondary cell.

Addition procedure component 1430 may perform a second network addition procedure associated with the second network node based on transmitting an addition procedure message to the second network node. The addition procedure component 1430 may perform the SCG addition procedure with a second network node based on the addition request. In some examples, the second network node is a primary cell of the UE.

Configuration component 1435 may configure a second network node based on the received report and transmit a secondary cell group (SCG) configuration to the UE based on the performing. Communication link quality component 1440 may determine that a communication link quality between the UE and the second network node is below a threshold value based on the received link information and PCI in the MAC CE. Additionally or alternatively, in some cases, communication link quality component 1440 may determine that the communication link quality between the UE and the second network node is above the threshold value based on the received link information and PCI in the MAC CE.

Figure 15:
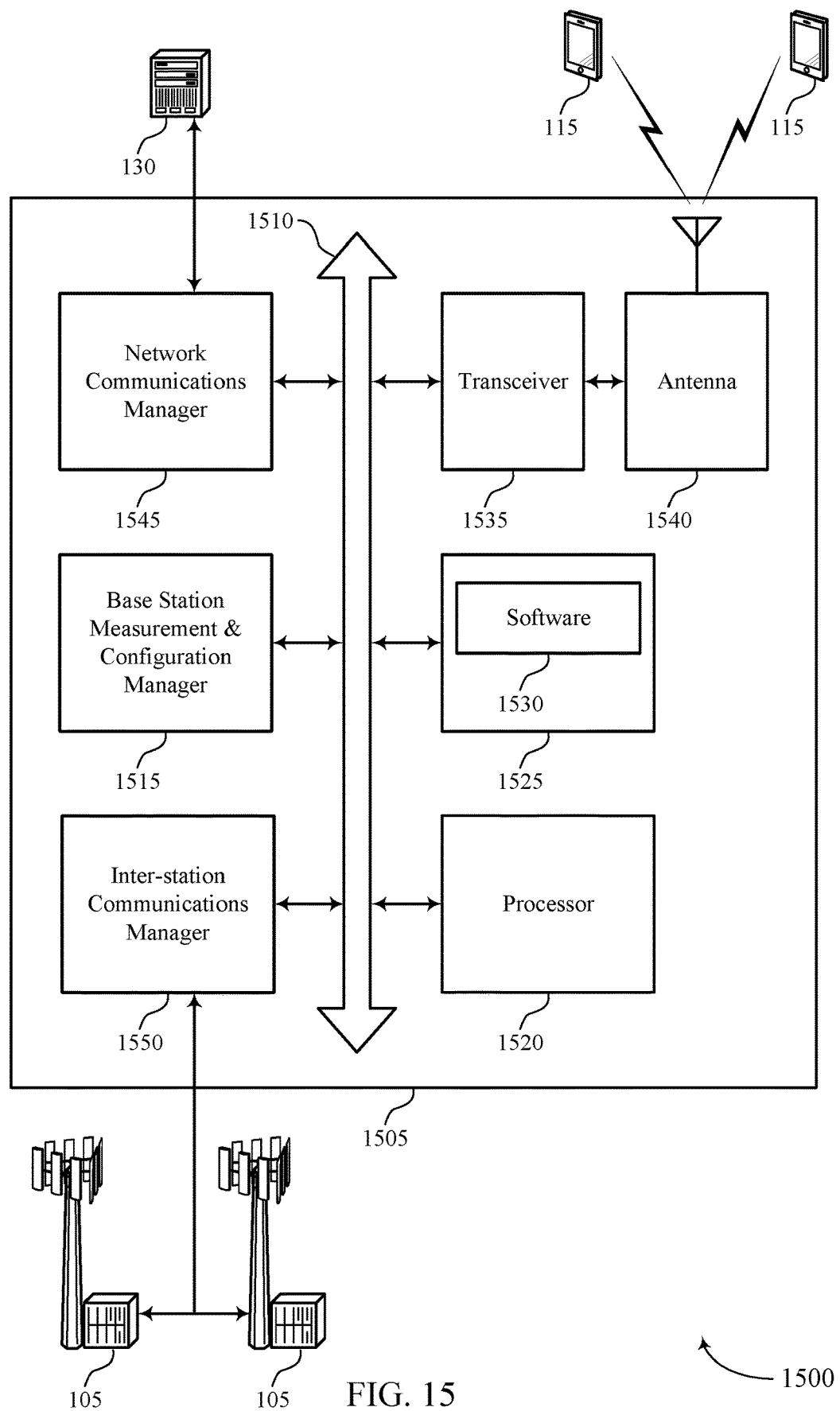
FIG. 15 illustrates a block diagram of a system including a base station that supports New Radio measurement and configuration in accordance with aspects of the present disclosure.

FIG. 15 shows a diagram of a system 1500 including a device 1505 that supports New Radio measurement and configuration in accordance with aspects of the present disclosure. Device 1505 may be an example of or include the components of base station 105 as described above, e.g., with reference to FIG. 1. Device 1505 may include components for bi-directional voice and data communications including components for transmitting and receiving communications, including base station measurement and configuration manager 1515, processor 1520, memory 1525, software 1530, transceiver 1535, antenna 1540, network communications manager 1545, and inter-station communications manager 1550. These components may be in electronic communication via one or more busses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting New Radio measurement and configuration).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices. Software 1530 may include code to implement aspects of the present disclosure, including code to support New Radio measurement and configuration. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas. In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115. Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an LTE/LTE-A wireless communication network technology to provide communication between base stations 105.

Figure 16:
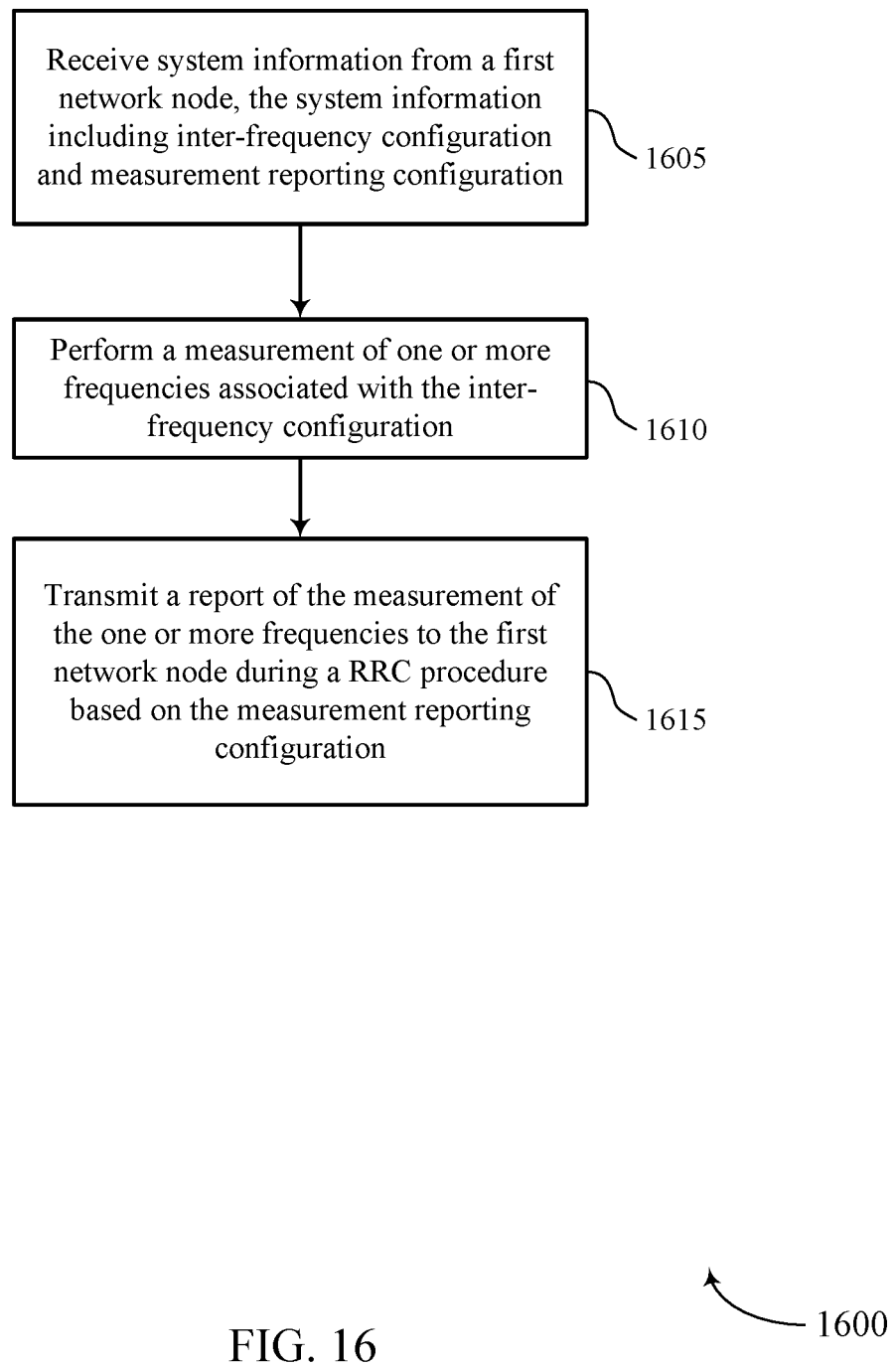
FIGS. 16 through 21 illustrate methods for New Radio measurement and configuration in accordance with aspects of the present disclosure.

FIG. 16 shows a flowchart illustrating a method 1600 for New Radio measurement and configuration in accordance with aspects of the present disclosure. The operations of method 1600 may be implemented by a UE 115 or its components as described herein. For example, the operations of method 1600 may be performed by a UE measurement and configuration manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive system information from a first network node. The system information may include inter-frequency configuration and measurement reporting configuration. The operations of block 1605 may be performed according to the methods described with reference to FIGS. 8 through 11. In certain examples, aspects of the operations of block 1605 may be performed by a receiver as described with reference to FIGS. 8 through 11.

At block 1610 the UE 115 may perform a measurement of one or more frequencies associated with the inter-frequency configuration. The operations of block 1610 may be performed according to the methods described with reference to FIGS. 8 through 11. In certain examples, aspects of the operations of block 1610 may be performed by a measurement component as described with reference to FIGS. 9 and 10.

At block 1615 the UE 115 may transmit a report of the measurement of the one or more frequencies to the first network node during a radio resource control (RRC) procedure based on the measurement reporting configuration. The operations of block 1615 may be performed according to the methods described with reference to FIGS. 8 through 11. In certain examples, aspects of the operations of block 1615 may be performed by a transmitter as described with reference to FIGS. 8 through 11.

Figure 17:
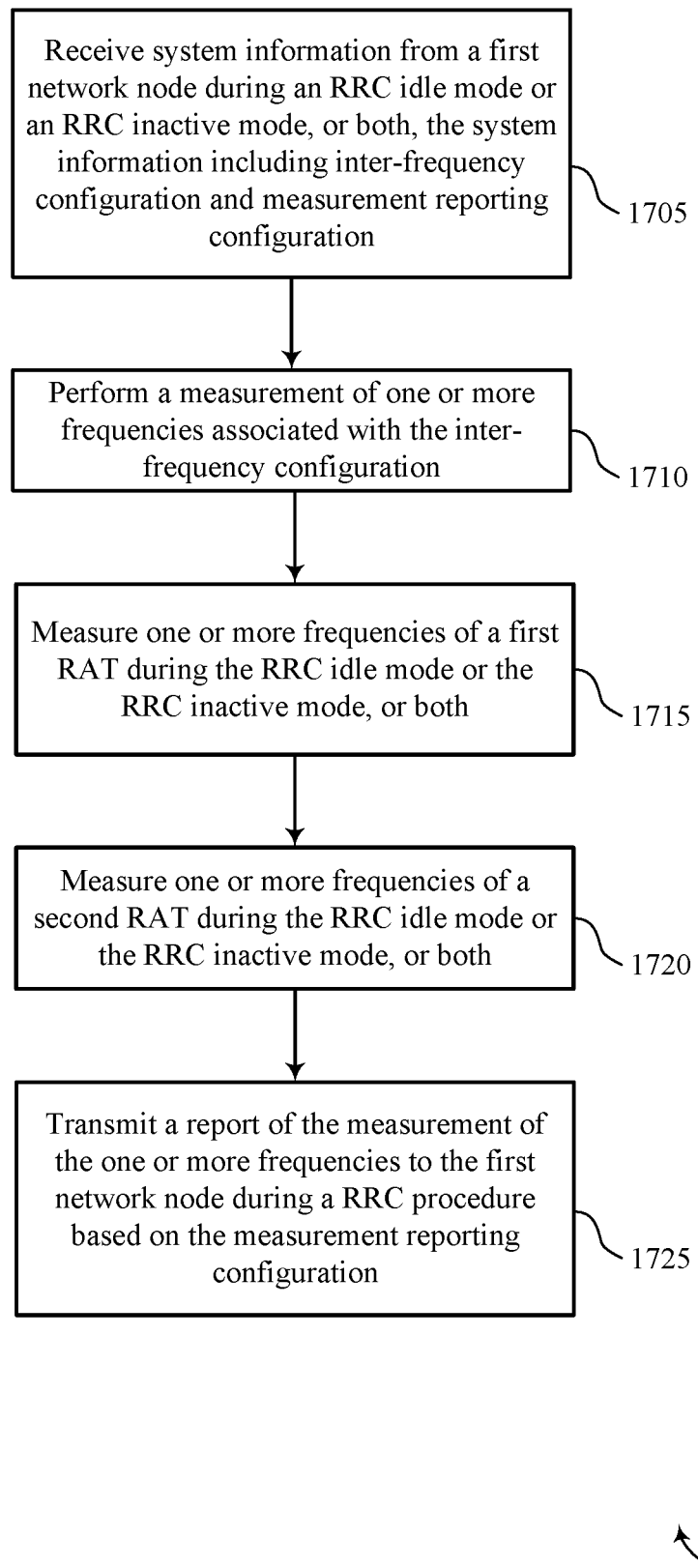

FIG. 17 shows a flowchart illustrating a method 1700 for New Radio measurement and configuration in accordance with aspects of the present disclosure. The operations of method 1700 may be implemented by a UE 115 or its components as described herein. For example, the operations of method 1700 may be performed by a UE measurement and configuration manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive system information from a first network node during a RRC idle mode or a RRC inactive mode, or both. The system information may include inter-frequency configuration and measurement reporting configuration. The operations of block 1705 may be performed according to the methods described with reference to FIGS. 8 through 11. In certain examples, aspects of the operations of block 1705 may be performed by a receiver as described with reference to FIGS. 8 through 11.

At block 1710 the UE 115 may perform a measurement of one or more frequencies associated with the inter-frequency configuration. The operations of block 1710 may be performed according to the methods described with reference to FIGS. 8 through 11. In certain examples, aspects of the operations of block 1710 may be performed by a measurement component as described with reference to FIGS. 9 and 10.

At block 1715 the UE 115 may measure one or more frequencies of a first radio access technology (RAT) during the RRC idle mode or the RRC inactive mode, or both. The operations of block 1715 may be performed according to the methods described with reference to FIGS. 8 through 11. In certain examples, aspects of the operations of block 1715 may be performed by a measurement component as described with reference to FIGS. 9 and 10.

At block 1720 the UE 115 may measure one or more frequencies of a second RAT during the RRC idle mode or the RRC inactive mode, or both. The operations of block 1720 may be performed according to the methods described with reference to FIGS. 8 through 11. In certain examples, aspects of the operations of block 1720 may be performed by a measurement component as described with reference to FIGS. 9 and 10.

At block 1725 the UE 115 may transmit a report of the measurement of the one or more frequencies to the first network node during a radio resource control (RRC) procedure based on the measurement reporting configuration. The operations of block 1715 may be performed according to the methods described with reference to FIGS. 8 through 11. In certain examples, aspects of the operations of block 1725 may be performed by a transmitter as described with reference to FIGS. 8 through 11.

Figure 18:
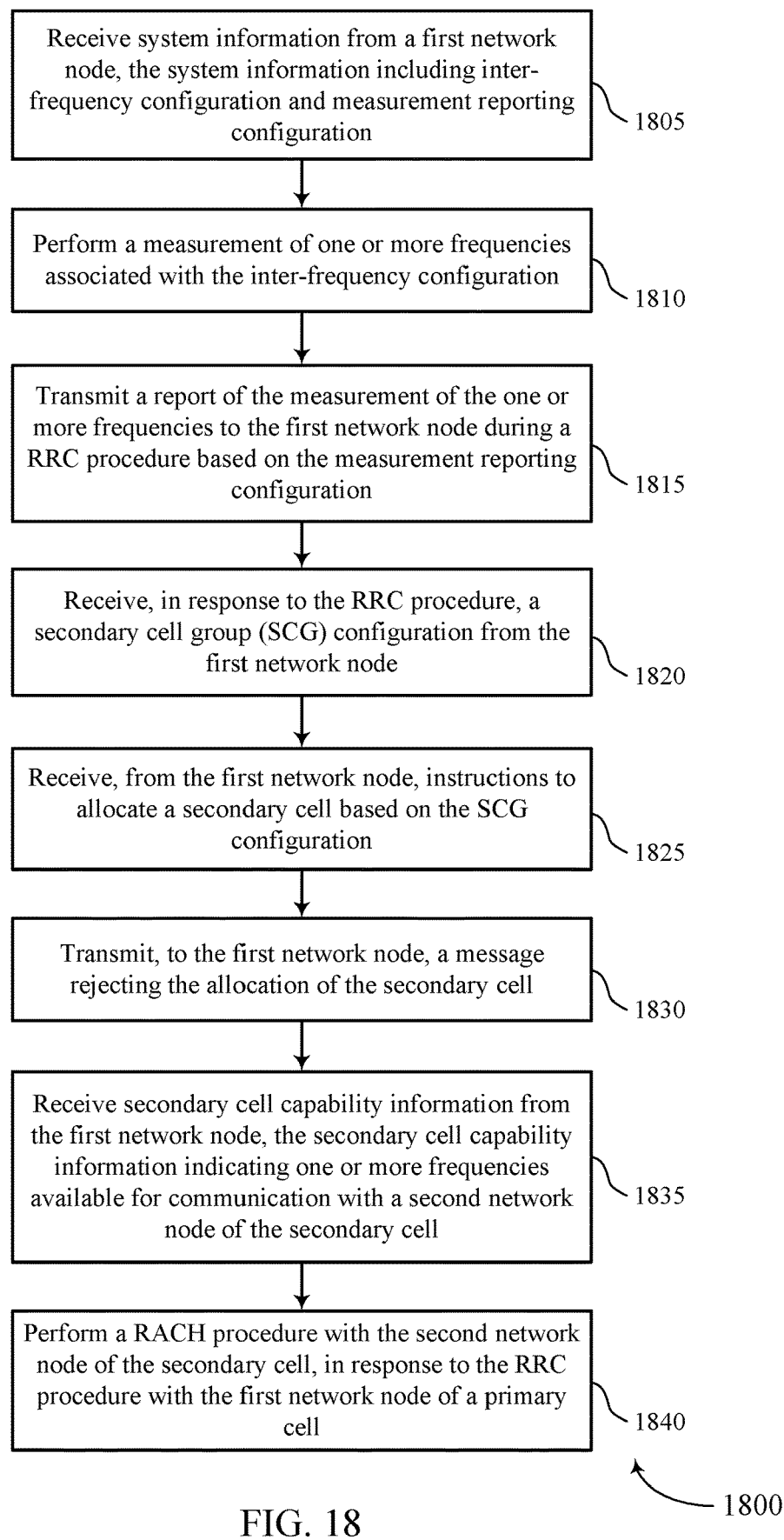

FIG. 18 shows a flowchart illustrating a method 1800 for New Radio measurement and configuration in accordance with aspects of the present disclosure. The operations of method 1800 may be implemented by a UE 115 or its components as described herein. For example, the operations of method 1800 may be performed by a UE measurement and configuration manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive system information from a first network node. The system information may include inter-frequency configuration and measurement reporting configuration. The operations of block 1805 may be performed according to the methods described with reference to FIGS. 8 through 11. In certain examples, aspects of the operations of block 1805 may be performed by a receiver as described with reference to FIGS. 8 through 11.

At block 1810 the UE 115 may perform a measurement of one or more frequencies associated with the inter-frequency configuration. The operations of block 1810 may be performed according to the methods described with reference to FIGS. 8 through 11. In certain examples, aspects of the operations of block 1810 may be performed by a measurement component as described with reference to FIGS. 9 and 10.

At block 1815 the UE 115 may transmit a report of the measurement of the one or more frequencies to the first network node during a radio resource control (RRC) procedure based on the measurement reporting configuration. The operations of block 1815 may be performed according to the methods described with reference to FIGS. 8 through 11. In certain examples, aspects of the operations of block 1815 may be performed by a transmitter as described with reference to FIGS. 8 through 11.

At block 1820 the UE 115 may receive, in response to the RRC connection procedure, a secondary cell group (SCG) configuration from the first network node. The operations of block 1820 may be performed according to the methods described with reference to FIGS. 8 through 11. In certain examples, aspects of the operations of block 1820 may be performed by a receiver as described with reference to FIGS. 8 through 11.

At block 1825 the UE 115 may receive, from the first network node, instructions to allocate a secondary cell based on the SCG configuration. The operations of block 1825 may be performed according to the methods described with reference to FIGS. 8 through 11. In certain examples, aspects of the operations of block 1825 may be performed by a receiver as described with reference to FIGS. 8 through 11.

At block 1830 the UE 115 may transmit, to the first network node, a message rejecting the allocation of the secondary cell. The operations of block 1830 may be performed according to the methods described with reference to FIGS. 8 through 11. In certain examples, aspects of the operations of block 1830 may be performed by a transmitter as described with reference to FIGS. 8 through 11.

At block 1835 the UE 115 may receive secondary cell capability information from the first network node. The secondary cell capability information may indicate one or more frequencies available for communication with a second network node of the secondary cell. The operations of block 1835 may be performed according to the methods described with reference to FIGS. 8 through 11. In certain examples, aspects of the operations of block 1835 may be performed by a receiver as described with reference to FIGS. 8 through 11.

At block 1840 the UE 115 may perform a random access channel (RACH) procedure with the second network node of the secondary cell, in response to the RRC connection procedure with the first network node of a primary cell. The operations of block 1840 may be performed according to the methods described with reference to FIGS. 8 through 11. In certain examples, aspects of the operations of block 1840 may be performed by a RACH component as described with reference to FIGS. 8 through 11.

Figure 19:
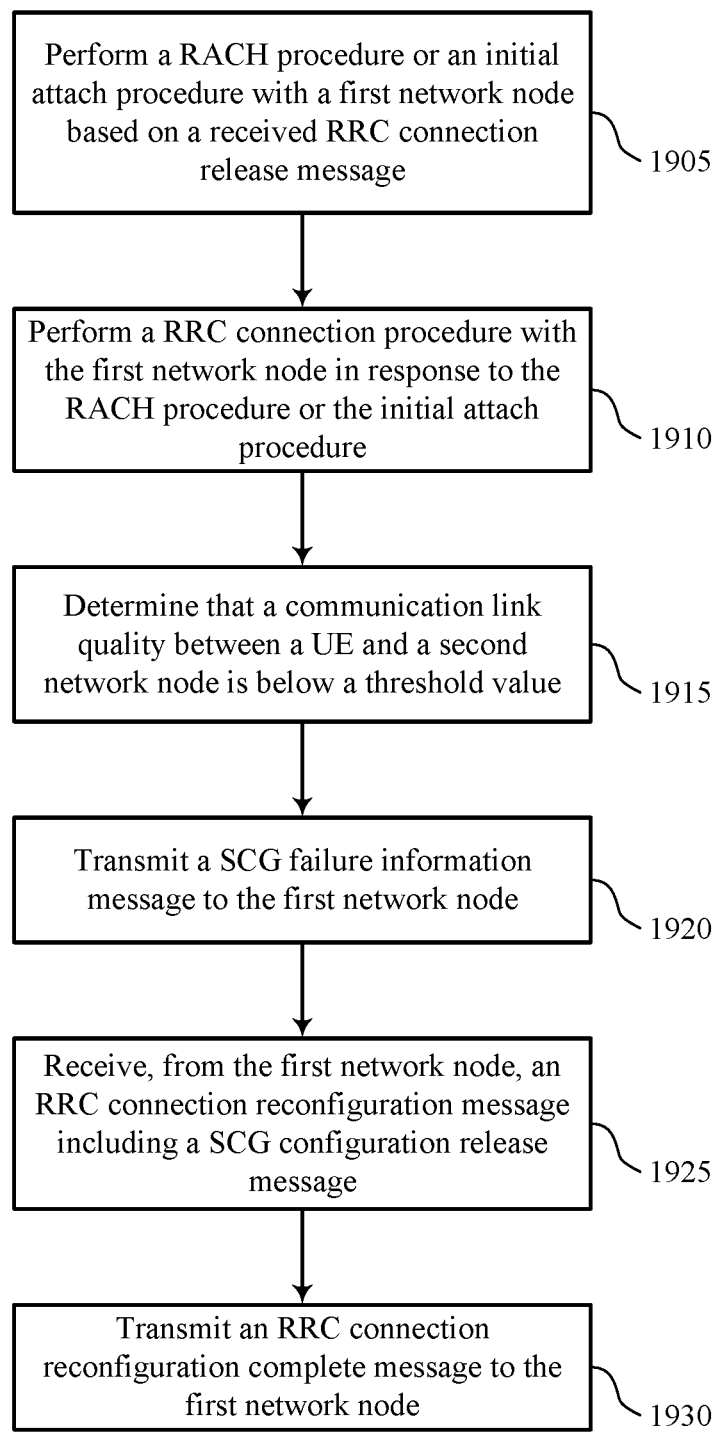

FIG. 19 shows a flowchart illustrating a method 1900 for New Radio measurement and configuration in accordance with aspects of the present disclosure. The operations of method 1900 may be implemented by a UE 115 or its components as described herein. For example, the operations of method 1900 may be performed by a UE measurement and configuration manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may perform a RACH procedure or an initial attach procedure with a first network node based on a received RRC connection release message. In some examples, the first network node may be base station 105. For example, the first network node may be associated with an LTE system or a NR system. The operations of block 1905 may be performed according to the methods described with reference to FIGS. 8 through 11. In certain examples, aspects of the operations of block 1905 may be performed by a RACH component as described with reference to FIG. 10.

At block 1910 the UE 115 may perform a RRC connection procedure with the first network node in response to the RACH procedure or the initial attach procedure. The operations of block 1910 may be performed according to the methods described with reference to FIGS. 8 through 11. In certain examples, aspects of the operations of block 1915 may be performed by a RRC component as described with reference to FIG. 10.

At block 1915 the UE 115 may determine that a communication link quality between a UE and the second network node is below a threshold value. The operations of block 1915 may be performed according to the methods described with reference to FIGS. 8 through 11. In certain examples, aspects of the operations of block 1915 may be performed by a communication link quality component as described with reference to FIG. 10.

At block 1920 the UE 115 may transmit a SCG failure information message to the first network node. The operations of block 1920 may be performed according to the methods described with reference to FIGS. 8 through 11. In certain examples, aspects of the operations of block 1920 may be performed by a transmitter as described with reference to FIGS. 8 through 11.

At block 1925 the UE 115 may receive, from the first network node, a RRC connection reconfiguration message that may include a SCG configuration release message. The operations of block 1925 may be performed according to the methods described with reference to FIGS. 8 through 11. In certain examples, aspects of the operations of block 1925 may be performed by a receiver as described with reference to FIGS. 8 through 11.

At block 1930 the UE 115 may transmit a RRC connection reconfiguration complete message to the first network node. The operations of block 1930 may be performed according to the methods described with reference to FIGS. 8 through 11. In certain examples, aspects of the operations of block 1930 may be performed by a transmitter as described with reference to FIGS. 8 through 11.

Figure 20:
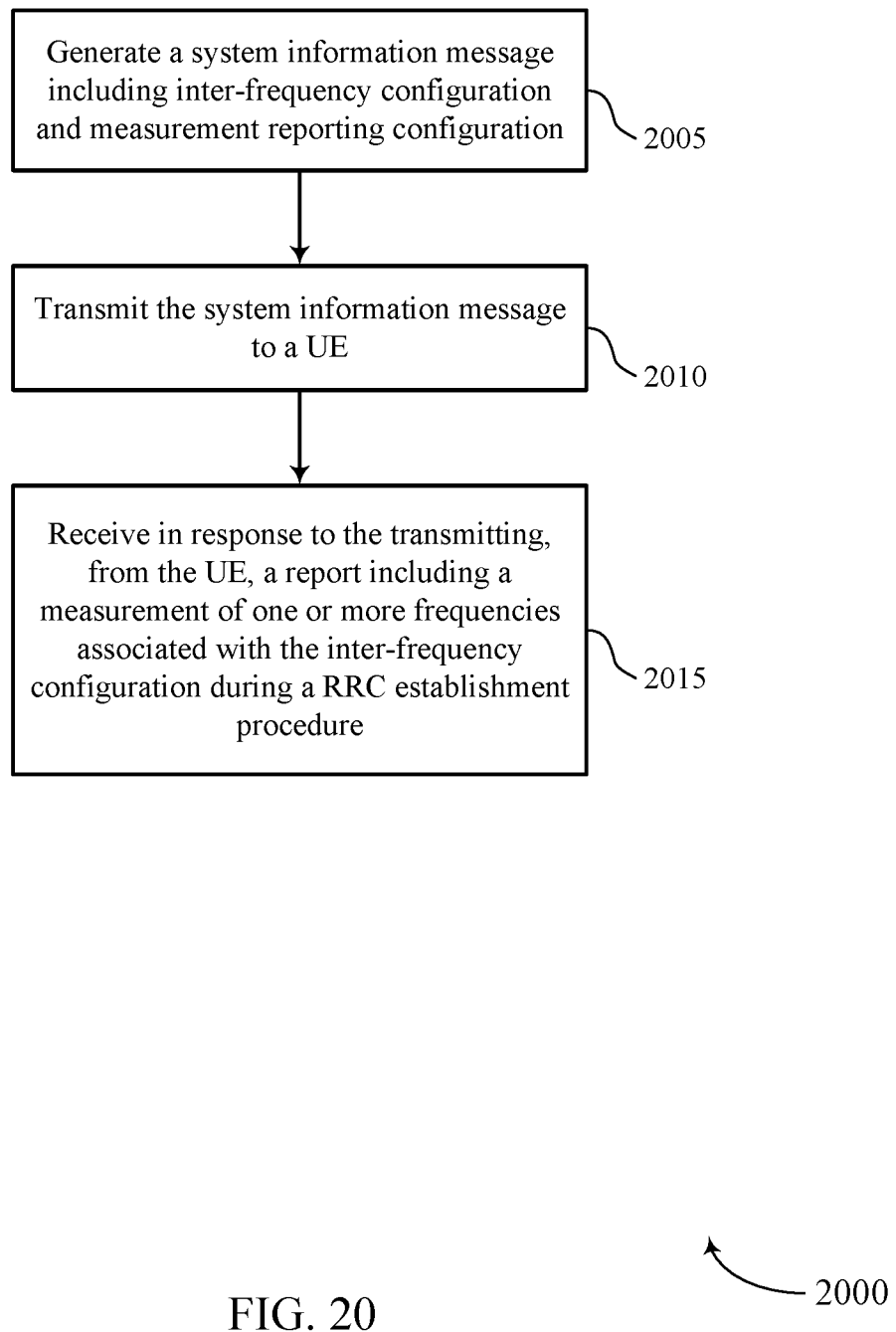

FIG. 20 shows a flowchart illustrating a method 2000 for New Radio measurement and configuration in accordance with aspects of the present disclosure. The operations of method 2000 may be implemented by a base station 105 or its components as described herein. For example, the operations of method 2000 may be performed by a base station measurement and configuration manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may generate a system information message including an inter-frequency configuration and a measurement reporting configuration. The operations of block 2005 may be performed according to the methods described with reference to FIGS. 12 through 15. In certain examples, aspects of the operations of block 2005 may be performed by a message component as described with reference to FIGS. 13 and 14.

At block 2010 the base station 105 may transmit the system information message to a UE. The operations of block 2010 may be performed according to the methods described with reference to FIGS. 12 through 15. In certain examples, aspects of the operations of block 2010 may be performed by a transmitter as described with reference to FIGS. 12 through 15.

At block 2015 the base station 105 may receive in response to the transmitting, from the UE, a report including a measurement of one or more frequencies associated with the inter-frequency configuration during a radio resource control (RRC) establishment procedure. The operations of block 2015 may be performed according to the methods described with reference to FIGS. 12 through 15. In certain examples, aspects of the operations of block 2015 may be performed by a receiver as described with reference to FIGS. 12 through 15.

Figure 21:
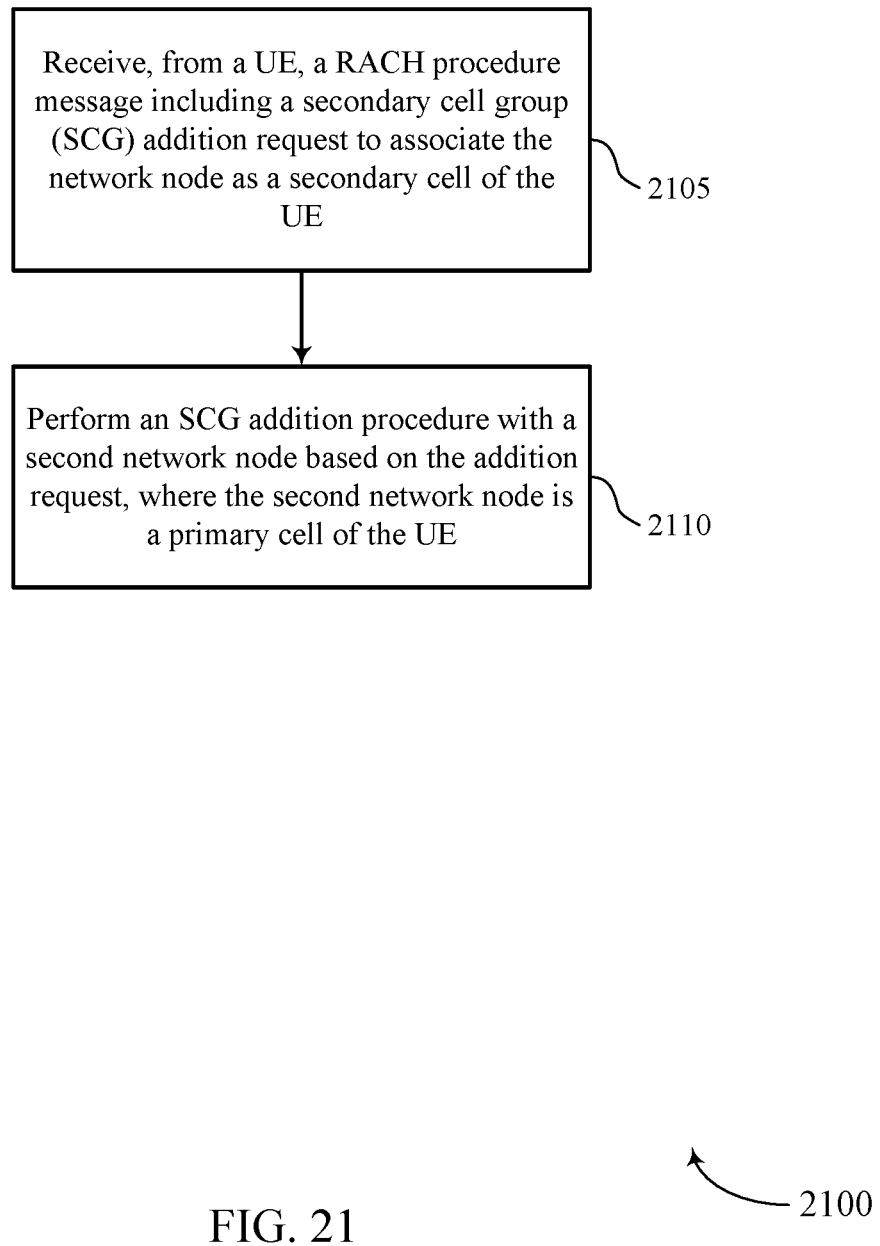

FIG. 21 shows a flowchart illustrating a method 2100 for New Radio measurement and configuration in accordance with aspects of the present disclosure. The operations of method 2100 may be implemented by a base station 105 or its components as described herein. For example, the operations of method 2100 may be performed by a base station measurement and configuration manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may receive, from a UE, a random access channel (RACH) procedure message including a secondary cell group (SCG) addition request to associate the network node as a secondary cell of the UE. The operations of block 2105 may be performed according to the methods described with reference to FIGS. 12 through 15. In certain examples, aspects of the operations of block 2105 may be performed by a RACH component as described with reference to FIGS. 13 and 14.

At block 2110 the base station 105 may perform an SCG addition procedure with a second network node based on the addition request. In some cases, the second network node may be a primary cell of the UE. The operations of block 2110 may be performed according to the methods described with reference to FIGS. 12 through 15. In certain examples, aspects of the operations of block 2110 may be performed by an addition procedure component as described with reference to FIGS. 13 and 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving system information from a first network node of a first radio access technology (RAT), the system information comprising an inter-frequency configuration and a measurement reporting configuration, the inter-frequency configuration indicating to the UE to measure one or more frequencies of the first RAT and one or more frequencies of a second RAT different from the first RAT;
   performing a measurement of frequencies associated with the inter-frequency configuration including the one or more frequencies of the first RAT and the one or more frequencies of the second RAT;
   transmitting, based at least in part on the measurement reporting configuration, a report of the measurement of the one or more frequencies of the first RAT and the one or more frequencies of the second RAT to the first network node during a radio resource control (RRC) connection procedure for setting up a connection to the first network node of the first RAT;
   receiving a RRC connection reconfiguration message from the first network node that comprises a setup message for a secondary cell group (SCG) configuration; and
   performing a random access channel (RACH) procedure or an initial attach procedure with the second network node based at least in part on the SCG configuration.

2. The method of claim 1, wherein the RRC connection procedure comprises a RRC establishment procedure or a RRC connection resume procedure.

3. The method of claim 1, wherein the receiving the system information comprises:
   receiving, from the first network node, a system information block (SIB) comprising the inter-frequency configuration or the measurement reporting configuration, or both.

4. The method of claim 1, wherein receiving the system information comprises:
   receiving the system information during a RRC idle mode or a RRC inactive mode.

5. The method of claim 4, wherein performing the measurement of the frequencies associated with the inter-frequency configuration comprises:
   performing a cell search on the frequencies; and
   measuring one or more cells on the frequencies associated with the inter-frequency configuration during the RRC idle mode or the RRC inactive mode.

6. The method of claim 4, further comprising:
   measuring the one or more frequencies of the first RAT during the RRC idle mode or the RRC inactive mode; and
   measuring the one or more frequencies of the second RAT during the RRC idle mode or the RRC inactive mode.

7. The method of claim 6, further comprising:
   receiving a configuration of the first RAT or the second RAT, or both, from the first network node.

8. The method of claim 1, further comprising:
   receiving the setup message for the SCG configuration during.

9. The method of claim 1, wherein receiving the SCG configuration from the first network node further comprises:
receiving, from the first network node, instructions for configuring a secondary cell based at least in part on the SCG configuration; and
transmitting, to the first network node, a message rejecting the configuring of the secondary cell.

10. The method of claim 1, further comprising:
receiving secondary cell capability information from the first network node, the secondary cell capability information indicating one or more frequencies available for communication with the second network node via secondary cells of the SCG configuration herein performing the RACH procedure further comprises performing the RACH procedure with the second network node via one of the secondary cells.

11. The method of claim 10, wherein the RACH procedure comprises a request to establish a connection with the second network node.

12. The method of claim 11, further comprising:
receiving a reestablishment message for the SCG configuration associated with the second network node based at least in part on the RACH procedure message.

13. The method of claim 12, further comprising:
establishing a connection to the second network node based at least in part on the SCG configuration, wherein establishing the connection to the second network node comprises releasing a connection associated with the first network node.

14. The method of claim 1, wherein performing the RACH procedure or the initial attach procedure further comprises:
performing the RACH procedure directly with one of the secondary cells of the second network node, in response to a radio link failure with the first network node.

15. The method of claim 1, further comprising:
receiving a RRC connection release message from the first network node, wherein performing the RACH procedure or the initial attach procedure with the second network node is further based at least in part on the RRC connection release message.

16. The method of claim 1, further comprising:
transmitting a RRC connection reconfiguration complete message to the first network node.

17. The method of claim 1, further comprising:
determining that a communication link quality between the UE and the second network node is below a threshold value;
transmitting a SCG failure information message to the first network node
wherein the RRC connection reconfiguration message comprising a SCG configuration release message; and
transmitting a RRC connection reconfiguration complete message to the first network node.

18. The method of claim 1, wherein performing the RACH procedure with the second network node comprises:
transmitting a RACH preamble to the second network node;
receiving a random access response message from the second network node based at least in part on the RACH preamble; and
transmitting a RRC connection request message comprising a physical cell identity (PCI) associated with the second network node in a medium access control (MAC) control element (CE) to the first network node based at least in part on the received random access response message.

19. A method for wireless communication at a first network node of a first radio access technology (RAT), comprising:
generating a system information message comprising an inter-frequency configuration and a measurement reporting configuration, the inter-frequency configuration indicating to the UE to measure one or more frequencies of the first RAT and one or more frequencies of a second RAT different from the first RAT;
transmitting the system information message to a user equipment (UE);
receiving, from the UE in response to the transmitting, a report comprising a measurement of the one or more frequencies of the first RAT and the one or more frequencies of the second RAT associated with the inter-frequency configuration during a radio resource control (RRC) connection procedure for setting up a connection between the UE and the first network node of the first RAT;
performing, based at least in part on the report, a second network addition procedure with a second network node for the UE; and
transmitting, to the UE, a RRC connection reconfiguration message that comprises a setup message comprising a secondary cell group (SCG) configuration configuring the second network node to serve the UE.

20. The method of claim 19, wherein transmitting the system information message comprises transmitting a system information block (SIB) message comprising the inter-frequency configuration or the measurement reporting configuration, or both.

21. The method of claim 19, wherein configuring the second network node comprises:
performing a second network addition procedure associated with the second network node based at least in part on transmitting an addition procedure message to the second network node; and
transmitting a secondary cell group (SCG) configuration to the UE based at least in part on the performing.

22. The method of claim 19, further comprising:
receiving, from the UE, a RRC connection request message comprising link information of the second network node and a physical cell identity (PCI) in a medium access control (MAC) control element (CE) associated with the second network node during the RRC establishment procedure;
determining that a communication link quality between the UE and the second network node is below a threshold value based at least in part on the received link information and PCI in the MAC CE; and
transmitting, to the UE, an indication of one or more master cell group (MCG) bearers in a RRC connection reconfiguration message.

23. The method of claim 19, further comprising:
receiving, from the UE, a RRC connection request message comprising link information of the second network node and a physical cell identity (PCI) in a medium access control (MAC) control element (CE) associated with the second network node during the RRC establishment procedure;
determining that a communication link quality between the UE and the second network node is above a threshold value based at least in part on the received link information and PCI in the MAC CE; and transmitting, to the UE, the indication of the one or more MCG bearers and the setup message for the secondary cell group (SCG) configuration in the RRC connection reconfiguration message based at least in part on the determining.

24. A user equipment (UE) comprising:
a processor;
memory in electronic communication with the processor; and
instructions stored in the memory and operable, when executed by the processor, to cause the apparatus to:
receive system information from a first network node of a first radio access technology (RAT), the system information comprising an inter-frequency configuration and a measurement reporting configuration, the inter-frequency configuration indicating to the UE to measure one or more frequencies of the first RAT and one or more frequencies of a second RAT different from the first RAT;
perform a measurement of frequencies associated with the inter-frequency configuration including the one or more frequencies of the first RAT and the one or more frequencies of the second RAT;
transmit, based at least in part on the measurement reporting configuration, a report of the measurement of the one or more frequencies of the first RAT and the one or more frequencies of the second RAT to the first network node during a radio resource control (RRC) connection procedure for setting up a connection to the first network node of the first RAT;
receive a RRC connection reconfiguration message from the first network node that comprises a setup message for a secondary cell group (SCG) configuration; and
perform a random access channel (RACH) procedure or an initial attach procedure with the second network node based at least in part on the SCG configuration.

25. An apparatus for wireless communication, in a system comprising:
a processor;
memory in electronic communication with the processor; and
instructions stored in the memory and operable, when executed by the processor, to cause the apparatus to:
generate, at a first network node of a first radio access technology (RAT), a system information message comprising an inter-frequency configuration and a measurement reporting configuration, the inter-frequency configuration indicating to the UE to measure one or more frequencies of the first RAT and one or more frequencies of a second RAT different from the first RAT;
transmit the system information message to a user equipment (UE);
receive, from the UE in response to the transmitting, a report comprising a measurement of the one or more frequencies of the first RAT and the one or more frequencies of the second RAT associated with the inter-frequency configuration during a radio resource control (RRC) connection procedure for setting up a connection between the UE and the first network node of the first RAT;
perform, based at least in part on the report, a second network addition procedure with a second network node for the UE; and
transmit, to the UE, a RRC connection reconfiguration message that comprises a setup message comprising a secondary cell group (SCG) configuration configuring the second network node to serve the UE.

* * * * *

UNITED STATES PATENT AND TRADEMARK OFFICE
CERTIFICATE OF CORRECTION

PATENT NO. : 11,184,785 B2
APPLICATION NO. : 15/847649
DATED : November 23, 2021
INVENTOR(S) : Zacharias et al.

Page 1 of 1

It is certified that error appears in the above-identified patent and that said Letters Patent is hereby corrected as shown below:

In the Claims

Claim 1, Column 44, Lines 33-35 should read:
"performing a random access channel (RACH) procedure or an initial attach procedure with a second network node based at least in part on the SCG configuration."

Claim 22, Column 46, Line 49 should read:
"RRC connection procedure;"

Claim 23, Column 46, Line 63 should read:
"RRC connection procedure;"

Claim 24, Column 48, Lines 1-3 should read:
"perform a random access channel (RACH) procedure or an initial attach procedure with a second network node based at least in part on the SCG configuration."

Signed and Sealed this
Fourth Day of March, 2025

Coke Morgan Stewart
*Acting Director of the United States Patent and Trademark Office*